US011977352B2

United States Patent
Wenus et al.

(10) Patent No.: US 11,977,352 B2
(45) Date of Patent: May 7, 2024

(54) IMAGE PROCESSING TECHNIQUES USING DIGITAL HOLOGRAPHIC MICROSCOPY

(71) Applicant: Intel Corporation, Santa Clara, CA (US)

(72) Inventors: Jakub Wenus, Maynooth (IE); Niall Cahill, Dublin (IE); Inbarasan Muniraj, Dharmapuri District (IN); Ashley Deflumere, Stoneybatter (IE); Michael McGrath, Virginia (IE)

(73) Assignee: Intel Corporation, Santa Clara, CA (US)

( * ) Notice: Subject to any disclaimer, the term of this patent is extended or adjusted under 35 U.S.C. 154(b) by 212 days.

(21) Appl. No.: 17/213,982

(22) Filed: Mar. 26, 2021

(65) Prior Publication Data

US 2021/0216039 A1 Jul. 15, 2021

Related U.S. Application Data

(60) Provisional application No. 63/000,951, filed on Mar. 27, 2020.

(51) Int. Cl.
*G03H 1/04* (2006.01)
*G03H 1/00* (2006.01)
(Continued)

(52) U.S. Cl.
CPC ......... *G03H 1/0443* (2013.01); *G03H 1/0005* (2013.01); *G03H 1/0866* (2013.01);
(Continued)

(58) Field of Classification Search
CPC .. G03H 1/0443; G03H 1/0005; G03H 1/0866; G03H 1/16; G03H 1/2202;
(Continued)

(56) References Cited

U.S. PATENT DOCUMENTS

2012/0135535 A1 * 5/2012 Grier .................. G02B 21/0068
436/164

FOREIGN PATENT DOCUMENTS

WO WO-2015167914 A1 * 11/2015 ......... G01N 15/0227

OTHER PUBLICATIONS

Reid et al (Challenges in using GPUs for the reconstruction of digital hologram images, J. Physics, Conf series 368, 012025, pp. 1-9, Date:2012) (Year: 2012).*
Tu et al (A parallel approach to digital holographic reconstruction with twin-image removal, Proc. IEEE Southeastcon, pp. 258-259, Date: Apr. 14, 1997) (Year: 1997).*
"Digital Holography", Ulf Schnars & Werner Jueptner, Paragraph 3.2.2, Springer, (2005).
(Continued)

*Primary Examiner* — Stephone B Allen
*Assistant Examiner* — Jyotsna V Dabbi
(74) *Attorney, Agent, or Firm* — Hanley, Flight & Zimmerman, LLC

(57) ABSTRACT

Digital holographic microscopy and related image processing techniques are described. A hologram captured in an image frame is split into different depths while a new hologram is being captured. Image slices of the hologram are determined and using free space impulse responses that are pre-calculated at a different precision than processing operations using the holographic data. Each computation is calculated in parallel based on the number of available processing cores and threads. The image slices are combined into a 2D array or 3D array to permit further processing of the combined array to count and size particles in the image frame. The reconstructed hologram is displayed at a subsequent image frame than that used to capture the hologram.

24 Claims, 17 Drawing Sheets

(51) Int. Cl.
*G03H 1/08* (2006.01)
*G03H 1/16* (2006.01)
*G03H 1/22* (2006.01)

(52) U.S. Cl.
CPC ............. *G03H 1/16* (2013.01); *G03H 1/2202* (2013.01); *G03H 2001/005* (2013.01); *G03H 2210/32* (2013.01); *G03H 2226/11* (2013.01)

(58) Field of Classification Search
CPC ...... G03H 1/0891; G03H 1/2294; G03H 1/22; G03H 2001/005; G03H 2001/0447; G03H 2001/0883; G03H 2001/0033; G03H 2001/0038; G03H 2001/0452; G03H 2001/2281; G03H 2001/2297; G03H 2210/32; G03H 2001/441; G03H 2226/11; G01N 15/1459; G01N 15/147; G01N 15/1429; G01N 15/1434; G01N 15/1463; G01N 15/1475; G01N 15/0227; G01N 2015/0053; G01N 2015/008; G01N 2015/0233; G01N 2015/1493
USPC ........................................................... 359/9
See application file for complete search history.

(56) References Cited

OTHER PUBLICATIONS

"How do Particle Counters Work?", [Online]. Retrieved from the Internet: <URL: https://web.archive.org/web/20180204141726/http://www.particlecounters.org/blog/how-do-particle-counters-work/>, (Feb. 4, 2018), 3 pgs.
"Particle counter", [Online]. Retrieved from the Internet: <URL: https://web.archive.org/web/20210421115838/https://en.wikipedia.org/wiki/Particle_counter>, (Apr. 21, 2021), 10 pgs.
Bjelkhagen, Hans I, et al., "Real-time reconstruction of digital holograms with GPU", Practical Holography XXVII: Materials and Applications Proc. of SPIE vol. 8644, (2013).
Cheng, Chau-Jern, et al., "Efficient FPGA-Based Fresnel Transform Architecture for Digital Holography", Journal of Display Technology 10(4), (Apr. 2014), pp. 272-281.
Hobson, P R, et al., "Challenges in using GPUs for the real-time reconstruction of digital hologram images", IOP Journal of Physics: Conference Series 415, 012042, (2013), 9 pgs.
Lopez, Danielle, et al., "Digital Holographic Image Reconstruction and GPU Acceleration", 2016 IEEE 37th Sarnoff Symposium, (2016), 2 pgs.
Ryle, James P, et al., "Lensless multispectral digital in-line holographic microscope", Journal of Biomedical Optics, 16 (12), 126004, (2011), 18 pgs.

\* cited by examiner

IMAGE PROCESSING TECHNIQUES USING DIGITAL HOLOGRAPHIC MICROSCOPY

PRIORITY CLAIM

This application claims the benefit of priority to U.S. Provisional Patent Application Ser. No. 63/000,951, filed Mar. 27, 2020, which is incorporated by reference herein in its entirety.

TECHNICAL FIELD

Embodiments described herein generally relate to imaging and image processing techniques involving the use of digital holographic microscopy.

BACKGROUND

The most common methods of particle detection and counting are by laser light scattering and/or blocking where a laser beam illuminates the particles and their scattered and/or absorbed signatures are detected and classified. Direct imaging has also been used for the purpose of particle counting where the particles are illuminated with a light source on one side and the image is formed using lenses on the other side as in a conventional transmission microscope.

The methods based on laser scattering can only approximately estimate the sizes and shapes of the particles and such methods do not provide any information about their in-depth distribution (along the laser beam). The methods that are based on direct imaging typically rely on the depth-of-field of the microscope objective, which is typically very low at high magnifications. Mechanical motion of the microscope objective is used to increase the depth range beyond that provided by the optics, which may reduce the speed at which particle count can be achieved. In essence, both laser-scattering and direct imaging capture only 2D information, which is then used to estimate the volumes of the particles. However, neither of the methods can distinguish between two or more particles overlapping along the source-detector axis, among other issues.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
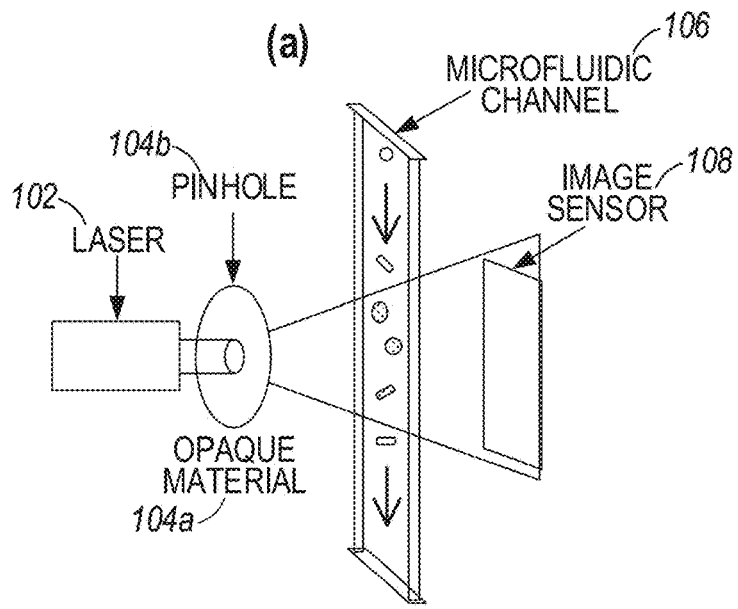
FIG. 1 is a schematic representation of a transmission-mode digital holographic microscope, used for imaging a fluidic channel, according to an example.

In the following description, methods, configurations, and related apparatuses are disclosed for the use of digital holographic microscopy (DHM) imaging and image processing. Various use cases and applications of such DHM imaging and image processing (such as fluidic channel imaging) are also described, but it will be understood that the following use cases may be expanded more broadly to other settings where DHM is used to capture or determine some information with noninvasive imaging.

Holography is an attractive, noninvasive imaging technique that offers the ability to view a complete three-dimensional (3D) volume of an object of interest from a single image known as 'hologram'. One way of capturing holograms is using in-line geometry in a manner similar to that applied to various imaging applications, including microscopy. DHM permits the study of imaging and tracking micro objects in space (~10 nanometers) and time (with microsecond precision). DHM may be used in a vast range of potential industrial and Internet of Things (IoT) use cases, including tribology, micro-plastics monitoring, bioprocess monitoring, cleanroom monitoring, particulate monitoring, particulate monitoring in various liquids, such as lakes, rivers, or deep sea/ocean, and particle specification, among others. Other uses may include medical uses, such as pathology (e.g., cancer), white cell count, determining the size and shape of drug particles (which is related to drug efficiency), and microfluidics. As described in more detail below, particle size and count may be undertaken using sparse particles disposed in a clear fluid.

In an example, a method of micro object (particle, microcrystal, cell, etc.) detection using DHM is disclosed. This may result in fast, efficient and accurate object counting and sizing within small volumes of fluids. The method may rely on parallel multi-depth holographic reconstruction. This method is based on synthetizing a combined multi-depth image from all reconstructed depths on-the-fly (i.e., as holograms are captured), with minimum delay to the reconstruction workflow. In particular, such a method of micro object detection may be used with DHM imaging techniques for particle detection, for counting and sizing in a volume of fluid. This technique includes capturing a holographic image of the volume followed by parallel holographic reconstruction at multiple depths, thus covering the whole volume simultaneously. The depth may be measured based on a reference plane associated with an image sensor used to capture the hologram. Due to the extra 3D information obtained through the multi-depth reconstruction, the technique will result in more accurate particle counting and sizing when compared to existing approaches. The 3D information may also help improve the ability to determine the particle type or particle characteristics; for instance, by having a 3D representation of a bacteria it will potentially be easier to identify the bacteria type.

Among other applications, this micro object detection technique offers more accurate particle/cell counting and sizing for a broad range of applications in medical diagnostics, biotechnology, pharmaceutical manufacturing, water quality inspection, monitoring of industrial crystallization process and more. The technique employs a relatively simple and cost-effective (lens-free) opto-mechanical setup and uses computations to perform the multi-depth image reconstruction as well as the subsequent image processing and analysis. The technique may be optimized for multi-core and many-integrated core processors, as well as being portable between different instruction set architecture platforms.

Also, in an example, optimizations may be used to increase the performance (throughput) of a holographic reconstruction workload, including with the use of multi-core and many-integrated core computer processing unit (CPU) platforms without graphics processing unit (GPU) acceleration. As is well understood, the process of holographic reconstruction is computationally intensive, especially for large image sizes and high frame rates. Such compute workloads are typically accelerated using powerful GPUs. Real-time holographic reconstruction, which may be considered to be processing of over about 20 frames-per-second, is a computationally intensive task that has been demonstrated only using expensive and powerful GPUs, especially for image sizes exceeding 1 Megapixel. In fact, multiple research reports claim GPU accelerations ranging from nearly 100× to over 1000× when compared to CPU-based computations.

The optimization techniques described herein may enable real-time holographic reconstruction to be achieved using multi-core and/or many-integrated-core processors, without resorting to GPU-based (or FPGA-based) accelerators. This in turn may simplify the design and reduces the cost of compute platforms dedicated to digital holography. With one technique, a focus is discussed for optimizing the convolution approach to holographic reconstruction by dividing the compute workload into two major parts: a first which uses double-precision computations and is computed only once (e.g., at the start of the process); and a second that can be computed with single precision without any noticeable quality loss and is computed for each and every hologram frame.

Micro-Object Detection

As above, DHM is a method of performing microscopic imaging without lenses. FIG. 1 is a schematic representation of a transmission-mode digital holographic microscope, used for imaging a fluidic channel. In its simplest form (inline transmission mode), the DHM imaging head may be composed of just three main components: a light source 102 to illuminate a target 106 (such as the microfluidic channel shown in FIG. 1), an opaque material 104a that contains a pinhole 104b, and an image sensor 108. The light source 102 may be a coherent light source (e.g., a laser) or a partially coherent light source, such as a light emitting diode (LED) if the sample 106 is sufficiently close to the image sensor 108. The image sensor 108 may be a charge-coupled device (CCD) or other semiconductor device (or other sensor) capable of detecting the wavelength of the light source 102 and converting the received light to an electrical signal. In some embodiments, the light source may emit light from a range of about 300 nm (UV) through visible light to over 1000 nm (NIR), the size of the pinhole 104b is about 1 mm-about 50 mm, the image sensor has an area of about 25-600 mm$^2$, and distance between the light source 102 and the image sensor 108 may be up to several cm, making the entire DHM system relatively compact.

In conventional microscope systems, a tradeoff exists between the field of view and magnification: the field of view increases with decreasing distance between the target and the image sensor, while decreasing distance between the target and the lens (which is between the target and the light source) results in better magnification. However, unlike conventional microscope systems, the DHM system may be able to provide both reasonable field of view and magnification due, at least in part, to the elimination of the lens.

Figure 2A:
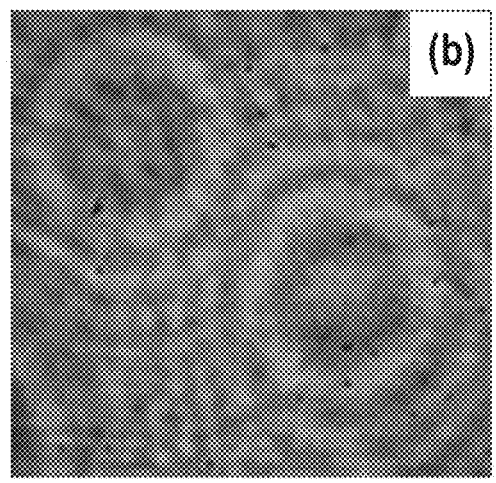
FIG. 2A depicts a hologram image obtained using a digital holographic microscope, according to an example.
Figure 2B:
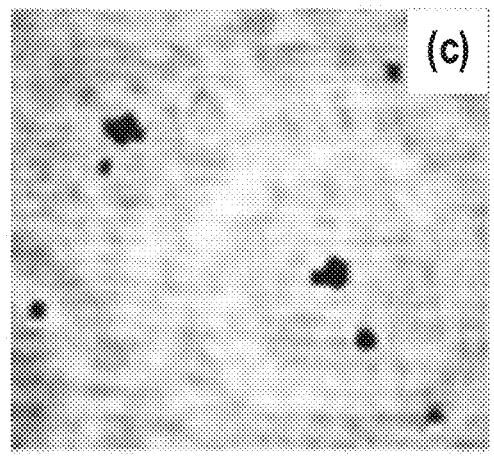
FIG. 2B depicts a corresponding reconstructed image obtained from the hologram image of FIG. 2A, according to an example.

FIG. 2A depicts a hologram image obtained using a DHM imaging configuration, specifically providing a hologram image of polymer microbeads (20 μm diameter) captured by such configuration; FIG. 2B depicts a corresponding reconstructed image obtained from the hologram image of FIG. 2A. The images shown, unlike conventional microscope systems, may be captured simultaneously, without having to mechanically refocus imaging optics to obtain in focus particles at different depths.

Figure 3A:
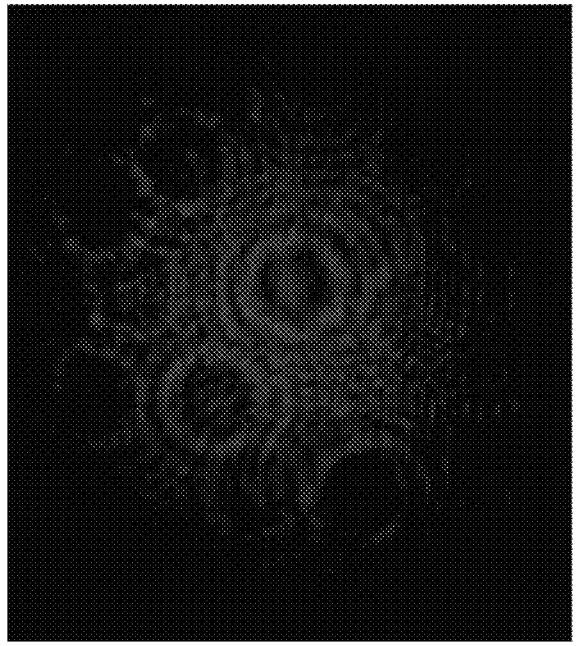
FIG. 3A depicts a hologram image of microbeads, obtained using a digital holographic microscope, according to an example.
Figure 3B:
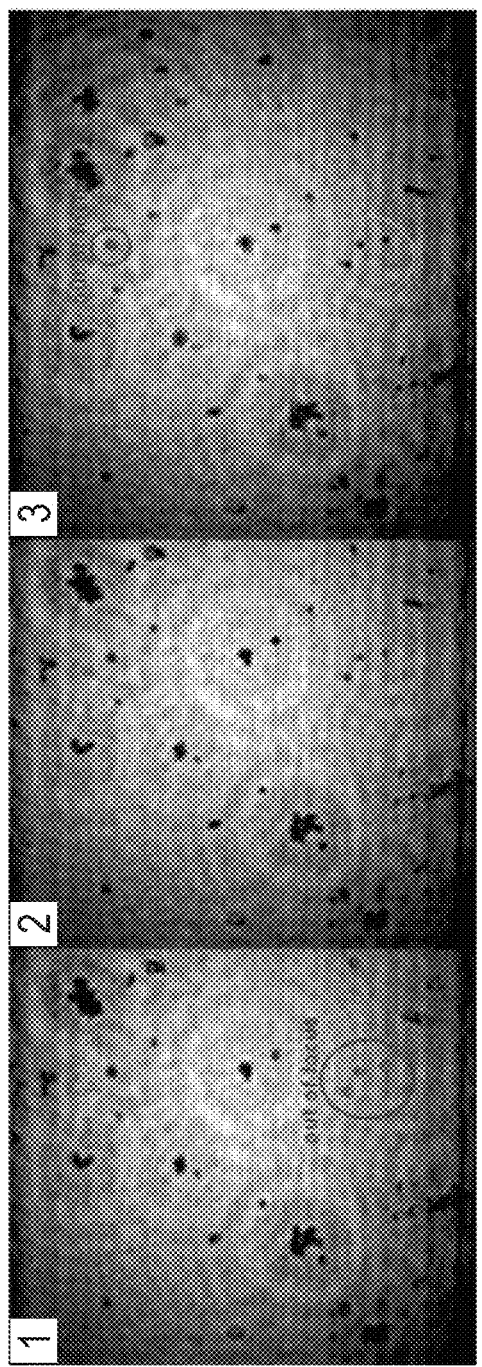
FIG. 3B depicts corresponding reconstructed images obtained from the hologram image of FIG. 3A, according to an example.

A unique feature of DHM is the ability to reconstruct the hologram at multiple depths (z-slices), thus permitting 3D information about the sample to be obtained without refocusing of optics. FIG. 3A depicts a hologram image of microbeads, obtained using a digital holographic microscope, providing an example of such a multi-depth reconstruction, and FIG. 3B depicts corresponding reconstructed images obtained from the hologram image of FIG. 3A. Specifically, the hologram image of FIG. 3A, depicting polymer microbeads suspended in water, is reconstructed at three different depths in the depictions of FIG. 3B. The markings in FIG. 3B indicate particles that are in-focus at certain depths and out-of-focus at different depths, thus highlighting the three-dimensional distribution of the particles within the imaged volume.

This reconstruction at various depths may be performed purely in the compute domain, without any mechanical motion in the DHM setup. Such capability has many practical applications, for instance in particle/cell counting and sizing used to accurately detect objects in the volume of the sample rather than only in a single focal plane.

Figure 4:
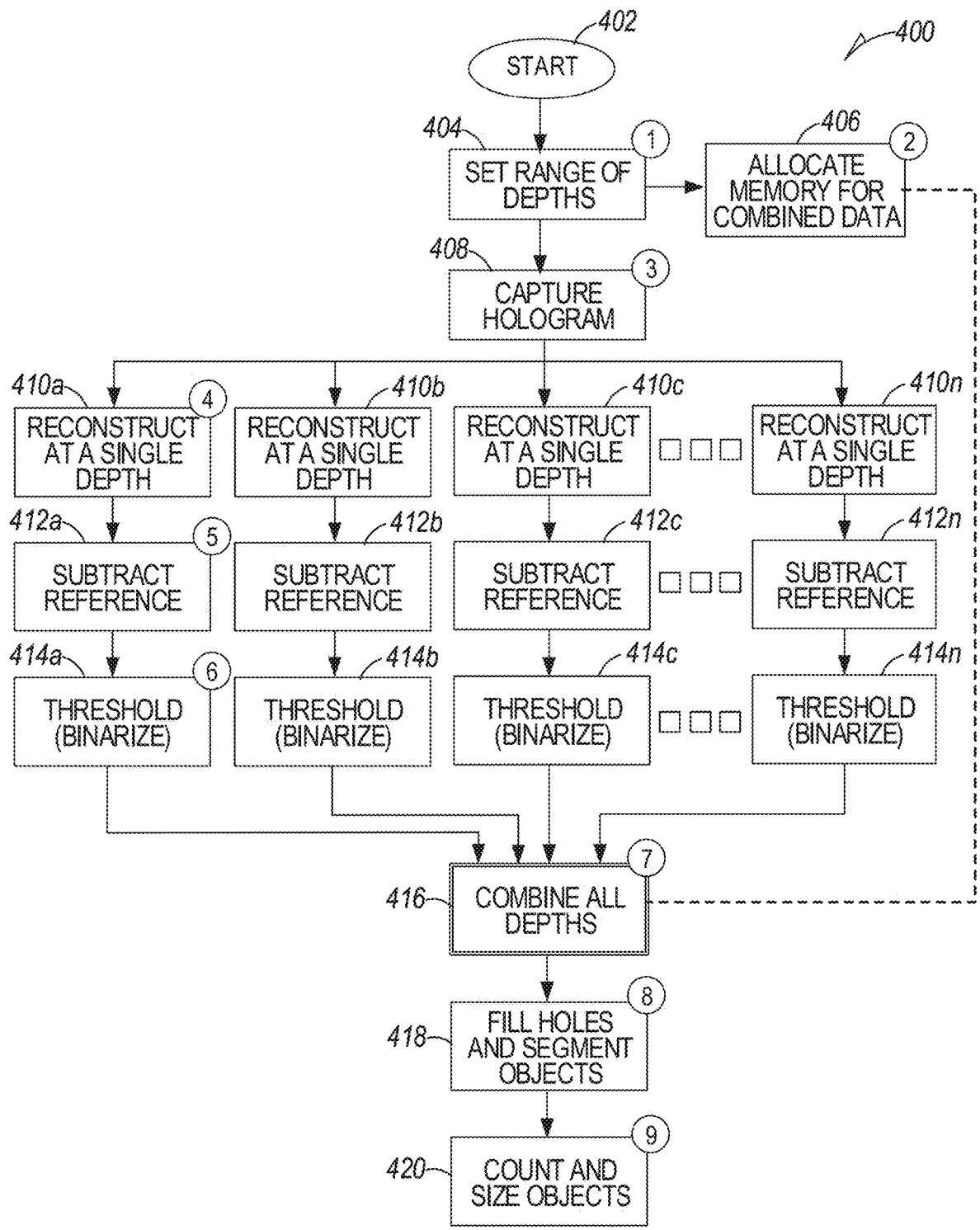
FIG. 4 is a flowchart of a particle detection and counting method, according to an example.
Figure 5:
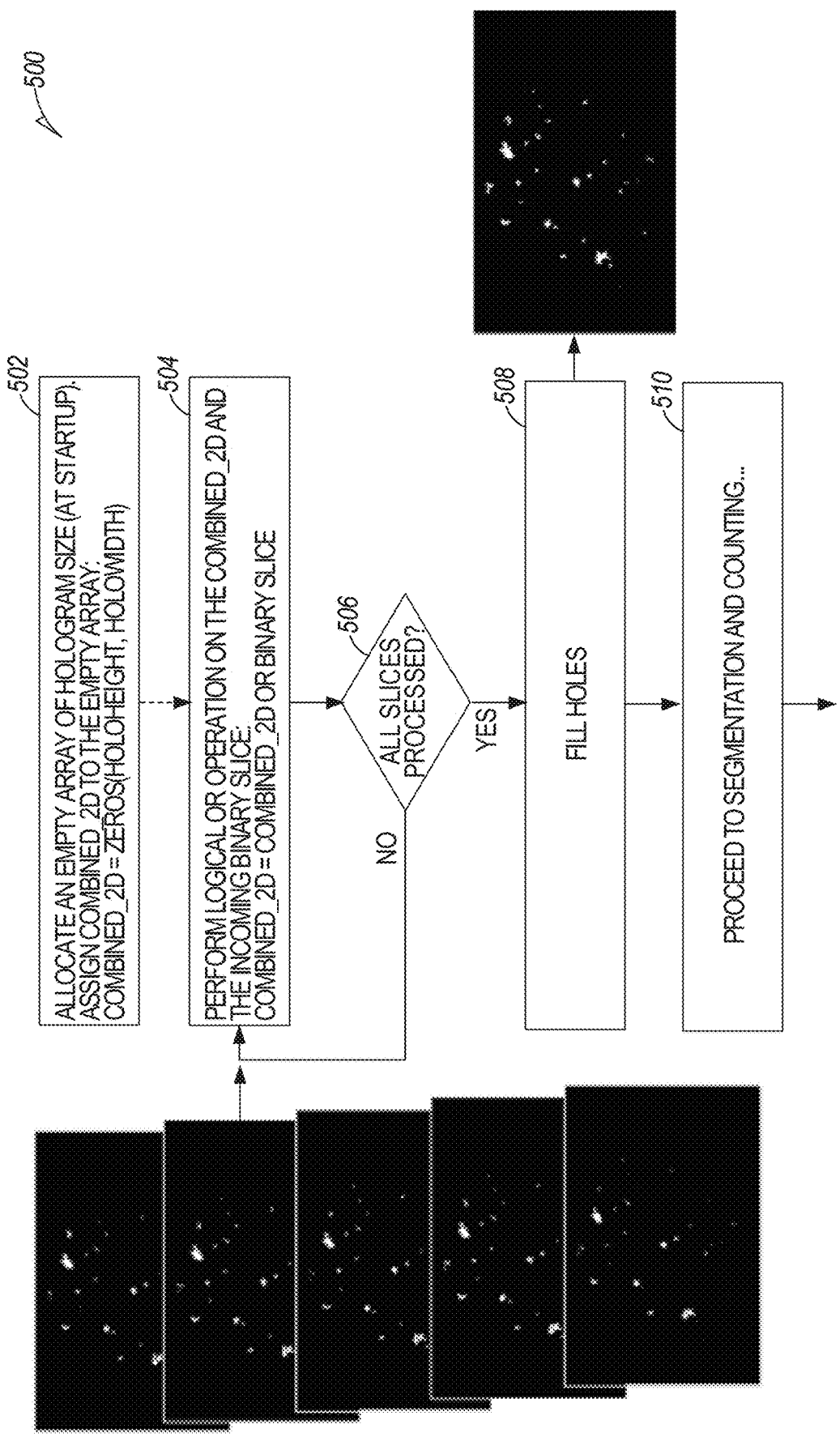
FIG. 5 depicts a method of two-dimensional multi-depth image synthesis for particle counting and sizing, according to an example.
Figure 6:
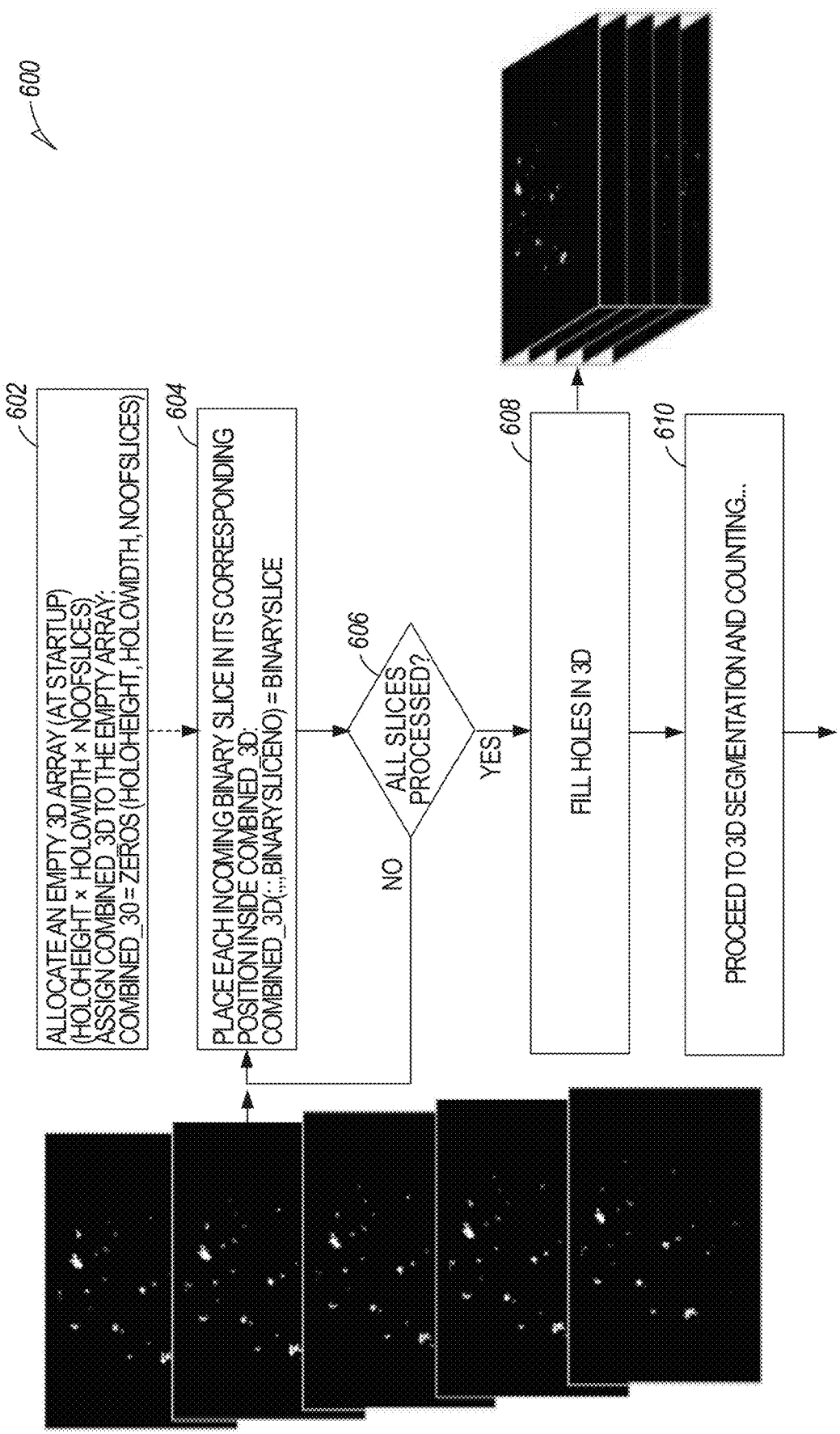
FIG. 6 depicts a method of three-dimensional multi-depth image synthesis for particle counting and sizing, according to an example.

FIG. 4 is a flowchart of an example particle detection and counting method using DHM. The flowchart describes primary steps involved in the particle detection and counting method. FIG. 5 depicts a method of two-dimensional multi-depth image synthesis for particle counting and sizing, according to an example. In some embodiments, operation (7) of FIG. 4 is further expanded in the flowchart of FIG. 5 for 2D multi-depth image synthesis. FIG. 6 depicts a method of three-dimensional multi-depth image synthesis for particle counting and sizing, according to an example. In some embodiments, operation (7) of FIG. 4 is further expanded in the flowchart of FIG. 6 for 3D multi-depth image synthesis.

The functions of the numbered operations in the process 400 of FIG. 4 are as follows:

Operation 1 (404): after the start (402), set the number of depths (z-slices) for the holographic reconstruction. The choice of the number may depend on the total depth of the volume to cover and the distance between consecutive slices. These parameters may be chosen empirically for each specific use case (e.g., microfluidics).

Operation 2 (406): Allocate memory for the combined (synthesized) image (produced in operation (416) below). The memory may be disposed in one or more layers of the edge compute system described in more detail below. The combined image is either a 2D array (as explained with reference to FIG. 5) or 3D array (as explained with reference to FIG. 6), with the 2D array taking less memory than the 3D array.

Operation 3 (408): Capture a lens-free hologram using the system shown in FIG. 1. The hologram may, as indicated above, include image slices at different depths that have been captured simultaneously.

Operation 4 (410a, 410b, 410c . . . 410n): Perform holographic reconstruction at multiple depths (image slices) simultaneously. As described in more detail below, this may dependent on the compute power available (number of cores and threads). The holographic reconstruction compute faculties for each image slice may be performed in one or more layers of the edge compute system and may be local to, or remote from, the memory used to store the image slice.

Operation 5 (412a, 412b, 412c . . . 412n): Subtract a reference image from each of the image slices. The reference image may be obtained in some embodiments prior to the hologram being captured as it may be substantially constant over time. Subtraction of the reference image, as shown, may also be performed simultaneously for each of the image slices. The subtraction may be used to correct for non-uniformities in the illumination from the light source shown in FIG. 1, as well as any imperfections in the target (e.g., microfluidic device). The subtraction compute faculties for each image slice may be performed in one or more layers of the edge compute system and may be local to, or remote from, the memory used to store the image slice.

Operation 6 (414a, 414b, 414c . . . 414n): Binarize the image by thresholding. The binarization is also performed in parallel for all selected depths. Binarization, as shown, may also be performed simultaneously for each of the image slices. Binarization, as it implies, may eliminate grayscaling within the image slice to ultimately provide elements that are either black or white, with no gray in between. For example, in an image slice that would otherwise be able to describe particles using 8 bits (where black=0 and white=256), dependent on the illumination source and scattering related to the particles, a threshold between the limits (0-256) may be used to determine whether or not a particle is present at a particular location. When a particle is determined to be present at a particular location within an image slice, the portion of that image slice is set to white (1) and black (0) otherwise. The threshold may be fixed or may be adaptive, e.g., based on empirical data or a training for an artificial intelligence (AI) system controlling the imaging system. Thresholding may be performed on intensity of illumination, as described, and/or on particle size. Accordingly, the size of a particle at different. The binarization compute faculties for each image slice may be performed in one or more layers of the edge compute system and may be local to, or remote from, the memory used to store the image slice and/or the subtraction compute faculties.

Operation 7 (416): Combine binarized images of all slices using 2D multi-depth image synthesis and/or 3D multi-depth image synthesis.

Operation 8 (418): Fill holes in the detected blobs and perform segmentation. That is, use 2D object segmentation if 2D multi-depth image synthesis is used and 3D object segmentation if 3D multi-depth image synthesis is used. A blob, as used herein, is a toroid. A blob is an artifact may be created by the binarization process. The missing portion of the blob (the artifact) may be filled in. During segmentation, the average size and deviation of particles, which may be determined empirically, may be used to determine the manner of segmentation.

Operation 9 (420): Count and size the segmented particles. As above, when 2D multi-depth image synthesis is used, 2D particle counting and sizing is faster and is accurate enough in case of sparse samples, especially where the particles have relatively regular shapes and do not overlap along the z-axis (depth). The 3D particle counting and sizing uses more memory and processing power but provides more accurate counting and sizing (3D-volume) of the detected particles.

As shown in FIG. 5, at the start of the 2D multi-depth image synthesis method 400, as shown in addition in FIG. 4, memory that is sufficient for a 2D array is allocated at operation 502. An identifier (combined_2D) is assigned to the empty array, whose elements are set to 0. At operation 504, a logical 'OR' operation in performed on an incoming binarized image slice and the array. This logical 'OR' is done whenever an image slice is processed and the corresponding binarized image slice arrives, the image slice is logically added to the result. At operation 506, the process determines whether all binarized image slices have been processed; if not, the process waits until the next slice is received at operation 504.

If all of the binarized image slices have been processed, at operation 508, the holes in the are identified and filled. The resulting array is shown at the right side of FIG. 5. In addition, at operation 508 the particles in the combined 2D array are segmented and then counted. This results in a combined 2D image slice and permits variation in image sizes to be observed using a relatively low amount of compute power and memory used to store the combined 2D image. In this case, if multiple particles coincide at different depths, the 2D image may not be able to discriminate between the particles—the smaller particle may be hidden as all image slices are not stored, the image slices may instead merely be combined.

In the 3D multi-depth image synthesis method 600 shown in FIG. 6, memory that is sufficient for a 3D array representing the scanned volume of the sample is allocated at operation 602. An identifier (combined_3D) is assigned to the empty array, whose elements are set to 0. At operation 604, an incoming binarized image slice is placed in the 3D array. Similar to the 2D multi-depth image synthesis method, this may also be done whenever a binarized image slice is processed and arrives to be processed. The image slice is copied to its corresponding place in the combined result.

At operation 606, the process determines whether all binarized image slices have been processed; if not, the process waits until the next slice is received at operation 604. As soon as the last binarized image slice is added to the combined result, the operations proceed to further processing steps. If all of the binarized image slices have been processed, at operation 608, the holes in the 3D array are identified and filled. The resulting array is shown at the right side of FIG. 6. In addition, at operation 608 the particles in the combined 3D array are segmented and then counted. This results in a combined 3D image slice that is more detailed but uses a relatively larger amount of compute power and memory than that used to obtain the combined 2D image.

Because both 2D multi-depth image synthesis and 3D multi-depth image synthesis are based on multi-depth imaging where all detected particles are in-focus, both 2D multi-depth image synthesis and 3D multi-depth image synthesis may result in higher accuracy when compared to the conventional particle counting and sizing methods described above. While 2D multi-depth image synthesis may be faster and more efficient in terms of processing and memory usage, 3D multi-depth image synthesis may be more accurate (at the cost of additional compute resources).

In scenarios in which efficient use of power is desirable (such as in battery-operated devices), the particle counting and sizing system may use an adaptive method for switching the 3D operation on and off depending on the characteristics of the sample.

Figure 7:
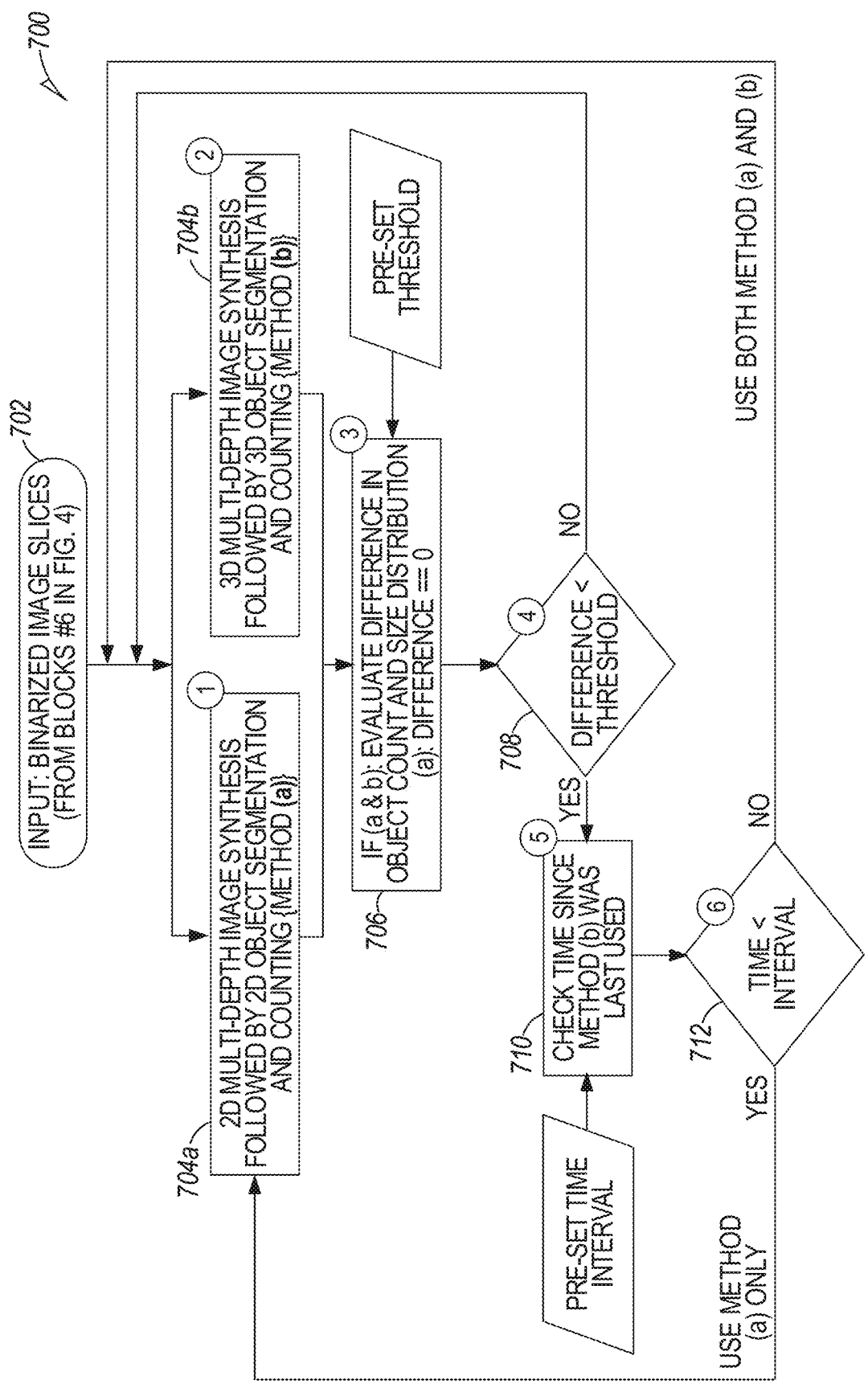
FIG. 7 is a flowchart of an adaptive selection of multi-depth image synthesis method, according to an example.

FIG. 7 is a flowchart of an adaptive selection of multi-depth image synthesis method. This flowchart shows a schematic flow diagram in which an evaluation of a difference between measurement results obtained using 2D multi-depth image synthesis and 3D multi-depth image synthesis and switch 3D multi-depth image synthesis off to conserve resources if the difference between 2D multi-depth image synthesis and 3D multi-depth image synthesis is negligible (i.e., within a pre-specified range). When 3D multi-depth image synthesis is switched off, the system periodically switches the 3D operation back on periodically to verify if the difference is still within that range. The periodicity may be pre-determined or may be adaptive, being based, for example, on available power (remaining battery). If the difference becomes substantial enough that the difference is not negligible, 3D multi-depth image synthesis may be switched back on and the difference between 2D multi-depth image synthesis and 3D multi-depth image synthesis may again be continuously monitored until the difference falls back within the negligible range. Use of adaptive selection may thus conserve processing and memory resources with minimum impact to accuracy of particle detection and counting.

FIG. 7 is a flowchart of an adaptive selection of multi-depth image synthesis method, according to an example. In detail, the adaptive selection of multi-depth image synthesis method 700 depicted in FIG. 7 includes reception of binarized image slices at operation 702. At operation 704*a* (also labeled 1 in FIG. 7) 2D multi-depth image synthesis is performed at each iteration and at operation 704*b* (also labeled 2 in FIG. 7) 3D multi-depth image synthesis is performed at startup and then every time when the accuracy of the 2D method is insufficient, as determined below.

At operation 706 (also labeled 3 in FIG. 7), the results of particle counting using the 2D image synthesis (operation 704*a*) are compared with equivalent results using the 3D image synthesis (operation 704*b*). If only 2D image synthesis is used, the difference may be defined to be 0 (or any value less than the pre-set threshold).

At operation 708 (also labeled 4 in FIG. 7), it is determined whether the difference determined at operation 706 is larger than the pre-set threshold. If so, the method 700 continues using both 2D image synthesis and 3D image synthesis.

At operation 710 (also labeled 5 in FIG. 7), if it is determined at operation 708 that the difference is smaller than the pre-set threshold, the time since 3D image synthesis was last used is determined.

At operation 712 (also labeled 6 in FIG. 7), if it is determined that the time determined at operation 710 is shorter than the pre-set interval, use 2D image synthesis only in the following iteration. If it is determined that the time determined at operation 710 since 3D image synthesis was last used is longer that the pre-set interval, the method determines at operation 712 to use both 2D image synthesis and 3D image synthesis in the next iteration to evaluate the difference between results from 2D and 3D synthesis. The pre-set time interval can be longer for more uniform samples and may be determined experimentally for each particular use case.

Optimized Computational Approaches and Workflows for DHM Imaging Reconstruction

Figure 8:
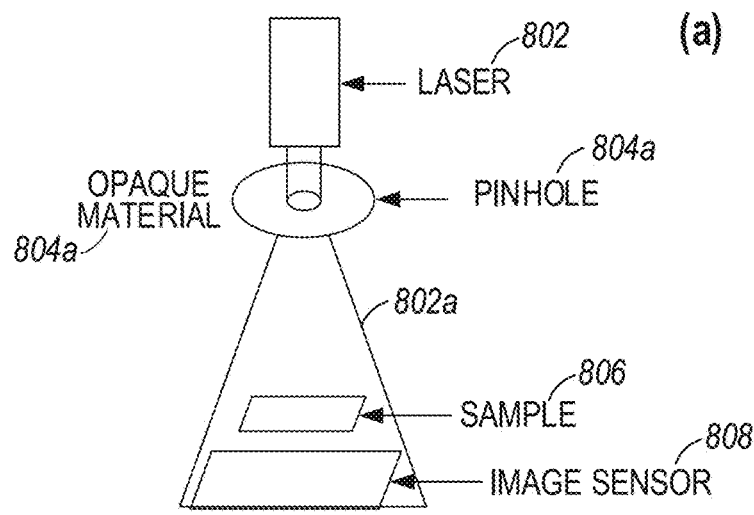
FIG. 8 is another schematic representation of a transmission-mode digital holographic microscope, used for imaging a sample, according to an example.
Figure 9A:
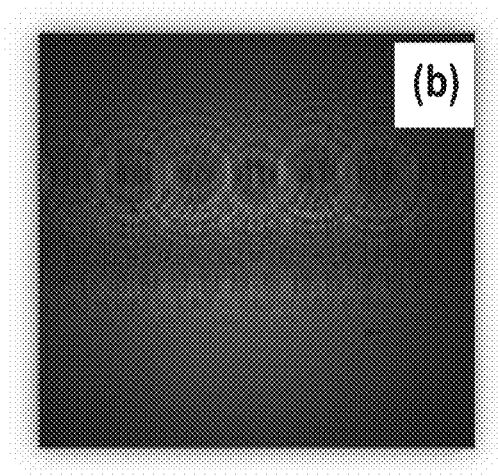
FIG. 9A depicts a hologram image obtained using a digital holographic microscope, according to an example.
Figure 9B:
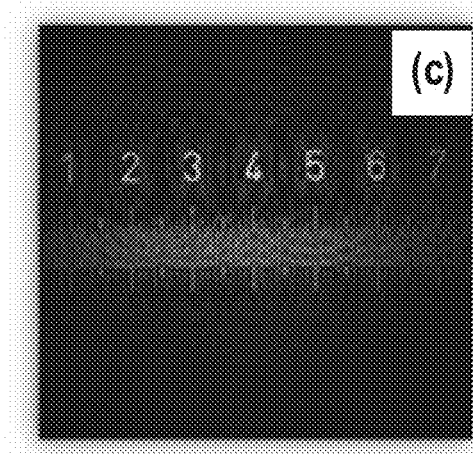
FIG. 9B depicts a corresponding reconstructed image obtained from the hologram image of FIG. 9A, according to an example.

FIG. 8 is another schematic representation of a transmission-mode digital holographic microscope, used for imaging a sample, with a basic inline configuration. The lensless DHM imaging head includes three primary components: a light source 802 that emits light 802*a* (coherent or incoherent), a pinhole 804*b* in an opaque material 804*a* and an image sensor 808, as shown schematically in FIG. 8. The physical parameters of FIG. 8 may be similar to that described in FIG. 1. The weakly scattered light from the sample 806 (known as the object beam) and the unscattered illumination light (known as the reference beam) superimpose at image sensor plane that results in the 2D interference (hologram) pattern. FIG. 9A depicts a raw hologram image of a microscopic ruler obtained using a digital holographic microscope. FIG. 9B depicts a corresponding reconstructed image obtained from the hologram image of FIG. 9A.

As indicated above, real-time (e.g., over 20 frames-per-second) holographic reconstruction is a computationally intensive task. At present, real-time holographic reconstruction at megapixel resolutions uses GPU/CUDA or FPGA-based accelerators. The predominant perception in the research community is that it is not possible to achieve such processing throughputs using CPU-based processing only.

Disadvantages of using GPU and/or FPGA-based accelerators include: additional cost, extra complexity, more development effort (especially in case of FPGAs), larger form factor to accommodate the coprocessor hardware, worse portability of the software implementations between hardware platforms, and memory-bandwidth issues. In addition, the GPU and/or FPGA accelerator cards typically communicate with the main CPU using a PCI Express (PCIe) interface. For large problem sizes, this may create an additional performance bottleneck related to moving data between the main RAM and the coprocessor onboard memory. Such issues do not apply to multi-core (e.g., Intel Xeon or Core) or bootable many-integrated-core CPUs where the memory bandwidth (e.g., DDR4 or multi-channel/high-bandwidth DRAM) and not the PCIe bandwidth is the limiting factor.

In an example, a technique is used for improving the speed of multi-depth (3D) holographic reconstruction based on the convolution approach. One way to provide acceleration is the use of parallel computations of the depth-dependent processing steps using an optimum number of threads, tailored both to the number of pre-set reconstruction depths and the available compute resources. The technique includes efficient parallelization of the most compute intensive part of the digital holography workflow (based on a convolution approach) when reconstructing each hologram frame at multiple depths (e.g., 2D slices of a 3D image volume).

Figure 10:
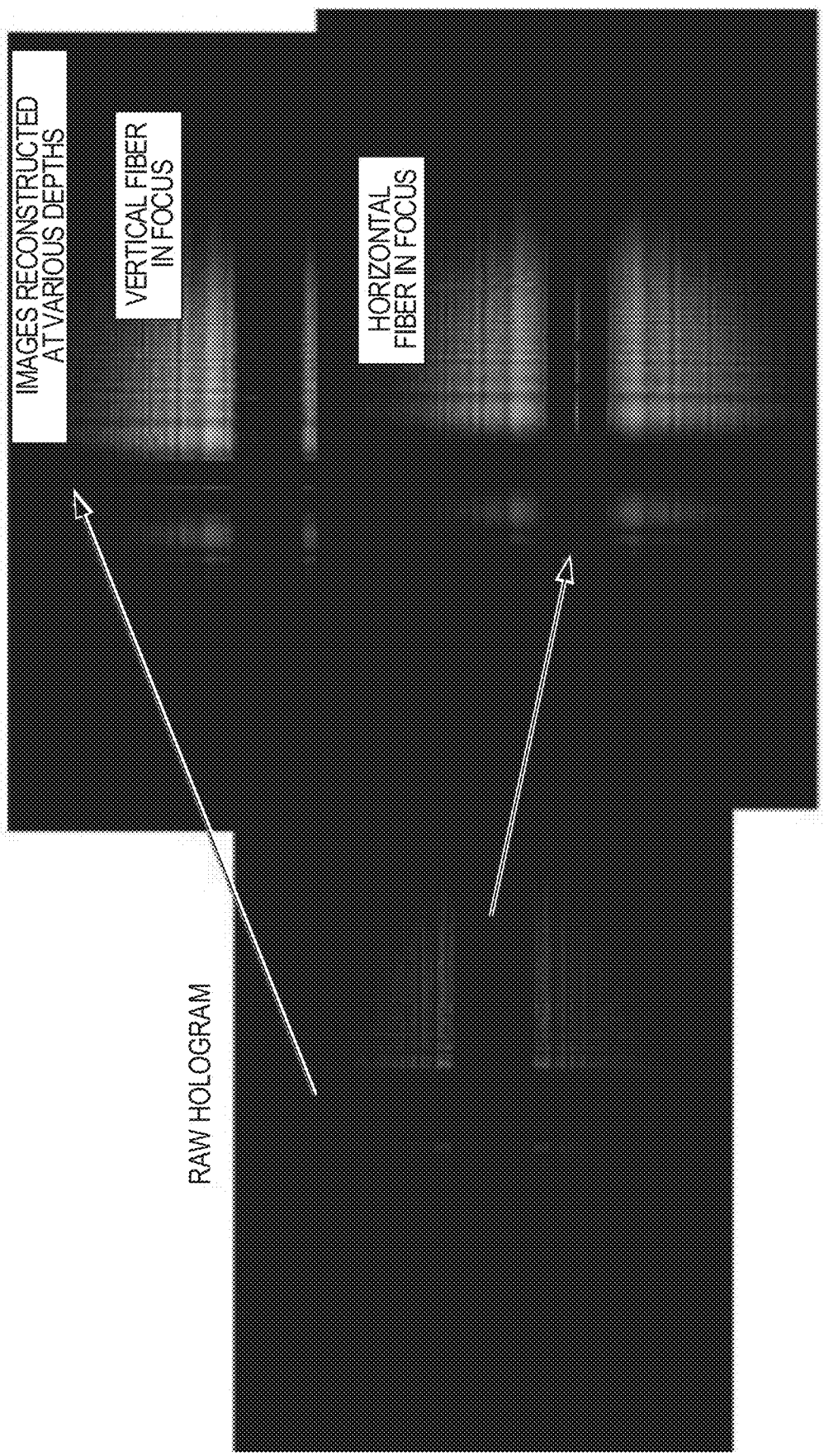
FIG. 10 depicts a multi-depth holographic reconstruction of two spatially-separated optical fibers, according to an example.

FIG. 10 provides a specific demonstration of multi-depth holographic reconstruction. Specifically, FIG. 10 depicts images from two spatially-separated optical fibers. As shown, the raw hologram 1010 is able to be deconstructed into separate image slices 1020, 1030 at different depths. As illustrated, different features are in focus/out of focus depending on the image slice—specifically either the vertical fiber is in focus (in 1020) and the horizontal fiber is in focus (in 1030).

Holographic reconstruction based on the convolution approach, in simplified terms, can be expressed as:

$$\Gamma = IFFT[FFT(H) \times FFT(g)] \quad \text{Equation (1)}$$

where:

$\Gamma$ is the reconstructed complex object image.

g is the impulse response of free space. As described in more detail below, this value is depth-dependent and object-independent, and thus can be pre-computed at startup or any other time independent of image capture.

H is the captured hologram. It is captured once for each frame, and is depth-independent.

FFT is the Fast Fourier Transform, which may be Math Kernel Library (MKL)-accelerated as described below.

IFFT is the Inverse Fast Fourier Transform, which may be MKL-accelerated as described below.

x denotes an element-by-element matrix multiplication (of the FFT(H) and FFT(g) matrixes).

One workflow of 3D holographic reconstruction of similar images may be achieved by techniques that use multiple core CPUs with multiple Open Multiprocessing (OpenMP) threads. OpenMP is a multithreading implementation, in which a primary thread (a series of instructions executed consecutively) forks a specified number of sub-threads and the system divides a task among them. The threads then run concurrently, with the runtime environment allocating threads to different processors. As above. FFT(g) is pre-computed for the whole pre-set range of reconstruction depths before acquiring any holograms and FFT(H) is computed once for each hologram frame captured by the image sensor. The workflow proceeds to setting the optimum number of threads to complete the multi-depth holographic reconstruction as efficiently as possible for the compute platform. Such a workflow may include:

Setting the number of OpenMP threads equal to the number of pre-set reconstruction depths (image slices). Thus, one OpenMP thread may be used per depth:

Setting the number of MKL threads to the rounded down ratio of the number of available hardware threads (or physical CPU cores) divided by the number of OpenMP threads. The MKL threads may be used for accelerating the multiplication and IFFT operations. In many instances, it is beneficial to use the number of available physical CPU cores instead of the number of available hardware threads (e.g., ignoring the logical processors created by hyper-threading). This may avoid extra overhead caused by increased occurrences of cache misses; and Calculating an inverse FFT (MKL-accelerated) of an element-by-element product of FFT(H) and FFT(g) on a separate OpenMP thread for each depth simultaneously.

These techniques, in order to be efficient, may involve fast access to sufficient amounts of memory and sufficient number of available hardware threads (a multiple of the number of pre-set reconstruction depths). Use of this technique may provide significant acceleration of a multi-depth holographic reconstruction workflow based on the convolution approach. The speed-up factor may vary depending on the use case and the specific compute platform. For example, when processing 10 Megapixel holograms with 8 depths (slices) per frame on a multiple core processor configuration, multiples of acceleration can be obtained using this optimization approach when compared to a sequential depth reconstruction.

Additionally, this optimization approach provides high portability of the workflow between different multi-core and many-integrated-core IA platforms, especially when using OpenMP and MKL for thread management. The use of OpenMP and MKL for thread management may enable real-time holographic reconstruction on compute platforms without GPU or FPGA-based coprocessors. Hence, this may result in lower cost, smaller form factor and potentially lower power consumption. In some embodiments that use edge computing, the compute platform can be moved closer to the edge (e.g., UEs, road side units (RSUs)), as described in more detail below.

Figure 11:
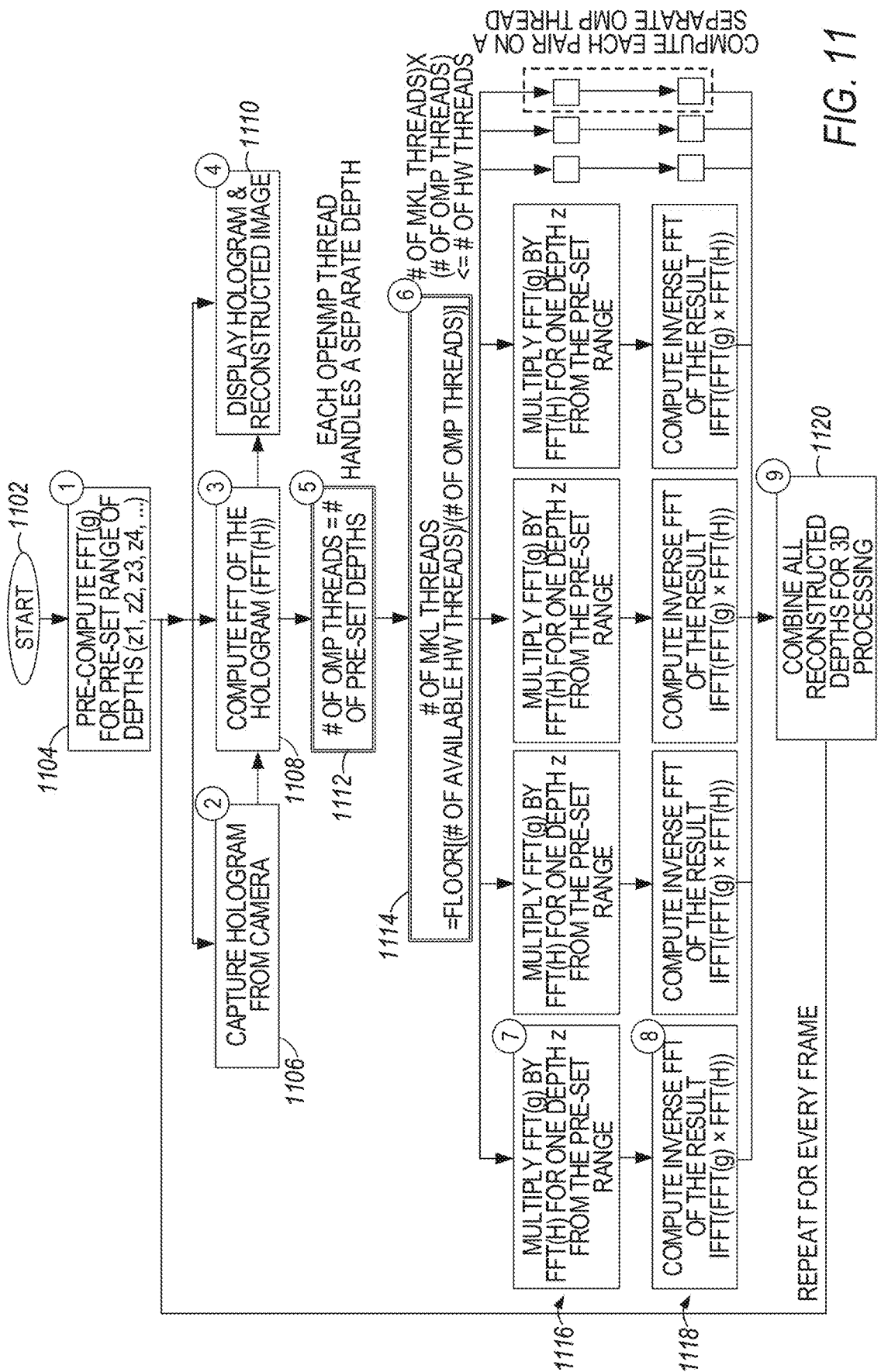
FIG. 11 is a flowchart of a holographic reconstruction workflow, using a convolution approach with optimized parallelization of a multi-depth reconstruction segment, according to an example.

FIG. 1I is a flowchart of a holographic reconstruction workflow, using a convolution approach with optimized parallelization of a multi-depth reconstruction segment. FIG. 11 specifically provides a simplified schematic representation of digital holography workflow 1100 based on the convolution approach (as expressed in Equation 2, below) with optimized parallelization of the multi-depth reconstruction segment.

After the start at operation 1102 of the method, at operation 1104 (also labeled 1 in FIG. 11) the Fourier transforms of the impulse response 'g' are computed for the whole range of pre-set depths. Here, as 'g' does not depend on the captured hologram, the FFT(g) can be computed at any point—such as only once at system startup. The results may then be stored in memory for later use). The number of image slices may be predetermined or may be dependent on the application to which the holography is applied. This can be performed on one or more CPUs/CPU cores as determined within the edge computing network described below. As above, the compute faculties of the various operations in FIG. 11 may be disposed in the same layer of the edge compute system as one or more other operations, or may be disposed in different layers of the edge compute system.

At operation 1106 (also labeled 2 in FIG. 11), the hologram is captured using the image capture system shown in FIG. 8 (e.g., using a camera). This may be done on a separate thread from the processing and display threads.

The Fourier transform of the captured hologram may be computed at operation 1108 (also labeled 3 in FIG. 11). As above, this can be performed on one or more CPUs/CPU cores as determined within the edge computing network described below.

The hologram and the reconstructed image are displayed at operation 1110 (also labeled 4 in FIG. 11). In embodiments in which the capture, processing, and display operations are running on separate threads, the display block shows the previously processed frame while the processing block reconstructs the previously captured hologram (sequence indicated by the block arrows in the diagram). That is the hologram captured is frame n, the FFT being computed is of the hologram captured in frame n−1, and the hologram and reconstructed image displayed is that of frame n−2. The display that displays the hologram and reconstructed image may be local to the hologram being captured and/or compute hardware used to compute the FFT or may be disposed, e.g., in a different layer of the edge computing system described below than one or both.

The following operations operate on the hologram captured in frame n−1. These operations include setting the number of OpenMP threads equal to the number of pre-set depths (image slices) at operation 1112 (also labeled 5 in FIG. 11).

After this, the number of MKL threads is set at operation 1114 (also labeled 6 in FIG. 11) to the rounded down ratio of the number of available hardware threads (or number of physical CPU cores) and the number of OpenMP threads (as set in block 5). For example, if the number of physical CPU cores in the system is 68 and the number of image slices is 10, the number of OpenMP threads may be set to 10 and the number of MKL threads may be calculated as floor (68/10) =6. Such an allocation of threads may result in an optimum nested parallelism in which each image slice is handled by a separate OpenMP thread and uses an optimum number of MKL threads to accelerate the multiplication and IFFT performed in later operations. To take full advantage of this thread allocation, the number of physical CPU cores (or number of available hardware threads) in the system is set to be a multiple of the number of simultaneously reconstructed image slices.

The Fourier transform of the impulse response (computed in at operation 1104) is multiplied by the Fourier transform of the hologram (computed in operation 1108) at operation 1116 (also labeled 7 in FIG. 11). This multiplication is an element-by-element 2D single-precision complex number matrix multiplication.

The inverse Fourier transform of the matrix computed in operation 1116 is calculated at operation 1118 (also labeled 8 in FIG. 11). The resulting complex 2D matrix may represent the reconstructed image slice (hologram image at the particular depth). In practice, to obtain the reconstructed slice intensity, the module of the matrix may be calculated and then scaled to 8-bit range for display and storage. Each pair of operations 1116 and 1118 may be performed separately for each depth (image slice) in parallel using the thread allocations described in operations 1112 and 1114.

All reconstructed depths are combined operation 1120 (also labeled 9 in FIG. 11) for 3D-based processing (for example volume-based particle/cell detection, counting, tracking, etc.). Repeat processing operations 1106-1120 (10) for each captured hologram (each frame).

Improvements to 3D Holographic Reconstruction Workflow

In a further example, optimization relates specifically to the convolution approach to holographic reconstruction to achieve a significant performance improvement by arranging the workflow. In general, double-precision floating point calculations may be used for each of the FFT and IFFT calculations. However, other embodiments involve reducing the precision of at least some of the calculations without appreciably reducing the reconstruction quality. This technique involves using double-precision floating point calculations only for the computations of the impulse response of free space. As above, because the impulse response is independent of the hologram, the impulse response may be calculated only once for a pre-specified range of depths. The pre-specified range of depths may be the distances between the reconstruction plane and the image sensor for a particular use case. This calculation may be determined, for example, at the beginning of the workflow.

Single-precision computations may then be used for the remaining, less-sensitive parts of the workflow. The single-precision computations may be computed for each and every hologram frame without any noticeable loss in the reconstructed image quality. The use of double-precision floating point calculations comes at a cost of more memory (preferably high-bandwidth) during the program operation. However, limiting the use of double-precision floating point calculations as above, combined with the use of mixed-precision computations, results in at least 3× speed-up of holographic reconstruction workflow based on the convolution approach. This may provide optimization particularly suitable for Intel-architecture multi-core and many-integrated core processors with direct access to high bandwidth memory (e.g., in a manycore processor setting). Further, this optimization may enable real-time holographic reconstruction on compute platforms without GPU or FPGA-based coprocessors, resulting in lower cost, smaller form factor, and potentially lower power consumption.

Holographic reconstruction based on the convolution approach is based on the following equation:

$$\Gamma(\xi, \eta, z) = \int_{-\infty}^{\infty}\int_{-\infty}^{\infty} H(x, y)g(\xi, \eta, x, y, x)dxdy \qquad \text{Equation (2)}$$

where:
Γ is the reconstructed complex object image.
H is the intensity hologram captured.
g is the impulse response of free space.
x, y, z are coordinates.
ξ—pixel size in the x-direction.
η—pixel size in the y-direction.
The impulse response of free space 'g' can be computed as follows:

$$g(\xi, \eta, x, y, x) = \frac{i\exp\left[-i(2\pi/\lambda)\sqrt{(x-\xi)^2 + (y-\eta)^2 + z^2}\right]}{\lambda\sqrt{(x-\xi)^2 + (y-\eta)^2 + z^2}} \qquad \text{Equation (3)}$$

where λ is the wavelength of laser light used in capturing the hologram and all the other parameters are the same as in Equation 2.

The convolution integral described in Equation 2 can be expressed as three Fourier transforms (two forward and one inverse), as described by Equation 4:

$$\Gamma(\xi,\eta,z)=F^{-1}\{F[H(x,y)](f,\eta,z)xF(g(\xi,\eta,z))\} \qquad \text{Equation (4)}$$

As is apparent, Equation 4 is the same as Equation 1, merely adding the pixel sizes and coordinates. The performance optimizations are based on the following properties of Equations 2, 3, and 4.

The captured hologram is relatively insensitive to the compute precision. That is, only the impulse response of free space (g) is sensitive to the precision of computations due to the exponent in Equation 3. Thus, g may be computed with double-precision (64 bits) as to do otherwise may severely impact the quality of the reconstructed image. The other processing steps can be safely performed with single-precision (32 bits) without any noticeable quality loss. In some embodiments, the double-precision computation may be performed closer to the center of an edge computing system described below (e.g., at a core data center), while the single-precision may be performed closer to the edge (e.g., at client compute nodes) due to the lower CPU and power used during the computation. In other embodiments, the disposition of the computation, whether single-precision or double-precision, may depend on the power source (e.g., plug in vs. battery) and/or amount of power available. For example, even if client compute nodes may be used, if the power level is low, the computation may instead occur at one or more edge gateway nodes. Creation of the 2D and 3D array described above may depend on similar considerations (e.g., 2D array creation toward the edge, 3D array creation toward the center). Alternatively or in addition, the number of client compute nodes used may depend on the desired compute power (e.g., number of cores and threads) to be used.

As above, as the impulse response of free space (g) does not depend on the captured hologram (H), the impulse response of free space (g) can be pre-computed for the range of depths (z) desired for the particular application. The pre-computed impulse response of free space (g) may then be stored in memory, and subsequently retrieved from memory and used in further computations as desired.

Figure 12:
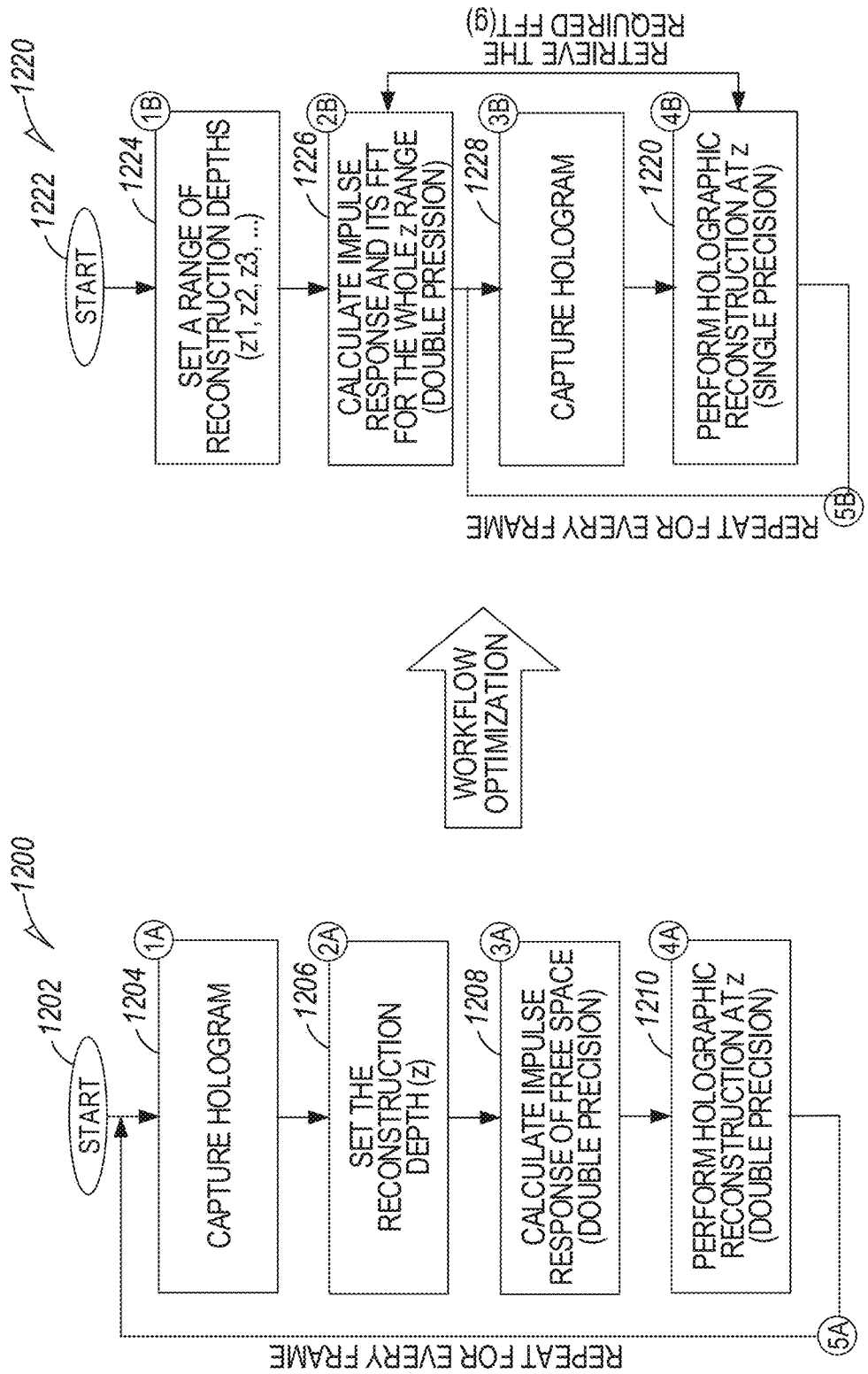
FIG. 12A is a flowchart of a holographic reconstruction workflow, according to an example.
FIG. 12B is a flowchart of a holographic reconstruction workflow, according to an example.

FIG. 12A is a flowchart of a holographic reconstruction workflow, using a convolution approach to provide workflow optimization. FIG. 12B is a flowchart of a holographic reconstruction workflow, according to an example. These flowcharts provide a simplified schematic view of the holographic reconstruction workflow based on the convolution approach (as in Equations 2-4). FIG. 12A represents the original workflow and FIG. 12B represents the optimized workflow.

After the start 1202 of the workflow 1200 of FIG. 12A, the processing steps include at operation 1204 (1A) capturing the hologram from the camera. At operation 1206 (2A), the reconstruction depth (z) is set. Subsequently, the impulse response (g) is computed for a single depth (z) with double precision at operation 1208 (3A). At operation 1210 (4A), holographic reconstruction is performed at the selected depth (z) with double precision. This process 1200 thus involves three double-precision FFTs (Equation 4). At (5A) all the above operations (1204-1210) are repeated for every captured hologram frame. Note that not only is the holographic reconstruction performed with double precision in every frame, but in addition, the impulse response at a particular depth is recomputed with double precision every time a holographic reconstruction at that depth is used.

After the start 1222 of the workflow 1220 of FIG. 12B, the processing steps include at operation 1224 (1B) setting a range of reconstruction depths (z1, z2, z3, . . . ). At operation 1226 (2B), a range of impulse response FFTs (FFT(g1), FFT(g2), FFT(g3), . . . ) corresponding to the range of depths (z1, z2, z3, . . . ) is pre-computed with double precision and the impulse response FFTs stored. Subsequently, the hologram is captured from the image sensor (e.g., camera) at operation 1228 (3B). At operation 1230 (4B), holographic reconstruction at a depth (z) selected from the pre-set range (z1, z2, z3, . . . ) with single precision. This process 1220 thus involves three double-precision FFTs (Equation 4). At (5B) all the above operations (1224-1230) are repeated for every captured hologram frame. Note that not only is the pre-computed FFT(g) corresponding to the selected depth used, but this involves only two single-precision FFTs.

The most compute intensive operations of the convolution workflow are the three FFTs (one inverse and two forward) as detailed in Equation 4. In order to simplify the estimate of the performance gain, the following assumptions may be made. (1) All three FFTs take approximately the same amount of time to compute (same matrix size); and (2) FFTs performed with double-precision take twice as much time as those performed with single-precision.

A comparison is performed only the parts of the workflow which are repeated for each frame, while ignoring the parts which are computed only once, e.g., at startup. The hologram capture and the setting of z (operations 1204, 1206, 1224 and 1226) may be ignored in the analysis, as their contribution to the amount of processing is negligible.

Based on the above, the recurring cost in the original workflow is equal to three FFTs performed with double precision (operation 1210) plus the calculation of the impulse response (operation 1208). After optimization, the recurring cost is equal to two FFTs performed with single precision (operation 1230). For instance, if one FFT with double precision takes 10 ms to compute, the recurring compute cost in the original workflow would take at least 3×10 ms=30 ms to complete a single iteration. In the optimized workflow, however, the recurring compute cost is 2×5 ms=10 Oms which is three times less than the time prior to optimization. In practice, the gain is even higher due to the extra computations performed in operation 1208 of the original workflow.

Example Computing Architectures

It will be understood that the preceding DHM image processing techniques may be implemented among a variety of computing platforms and settings. Some of the applicable computing platforms may include edge computing or Internet of Things (IoT) deployments, which are able to process imaging data closer to the imaging source (closer to the "edge"). This is particularly relevant for scenarios where compute capability for DHM image processing is provided via an edge or endpoint computing device (even a laptop) connected to a DHM imaging system, enabling highly mobile use cases such as environmental monitoring (e.g. water samples).

Edge computing, at a general level, refers to the transition of compute and storage resources closer to endpoint devices (e.g., consumer computing devices, user equipment, etc.) in order to optimize total cost of ownership, reduce application latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at the "edge" of the network. Edge computing and related technologies thus attempt to provide reduced latency, increased responsiveness, and more available computing power than offered in traditional cloud network services and wide area network connections.

In the context of satellite communication networks, edge computing operations may occur by: moving workloads onto compute equipment at satellite vehicles: using satellite connections to offer backup or (redundant) links and connections to lower-latency services; coordinating workload processing operations at terrestrial access points or base stations; providing data and content via satellite networks; and the like. Thus, many of the same edge computing scenarios that are described below for mobile networks and mobile client devices are equally applicable when using a non-terrestrial network.

Figure 13:
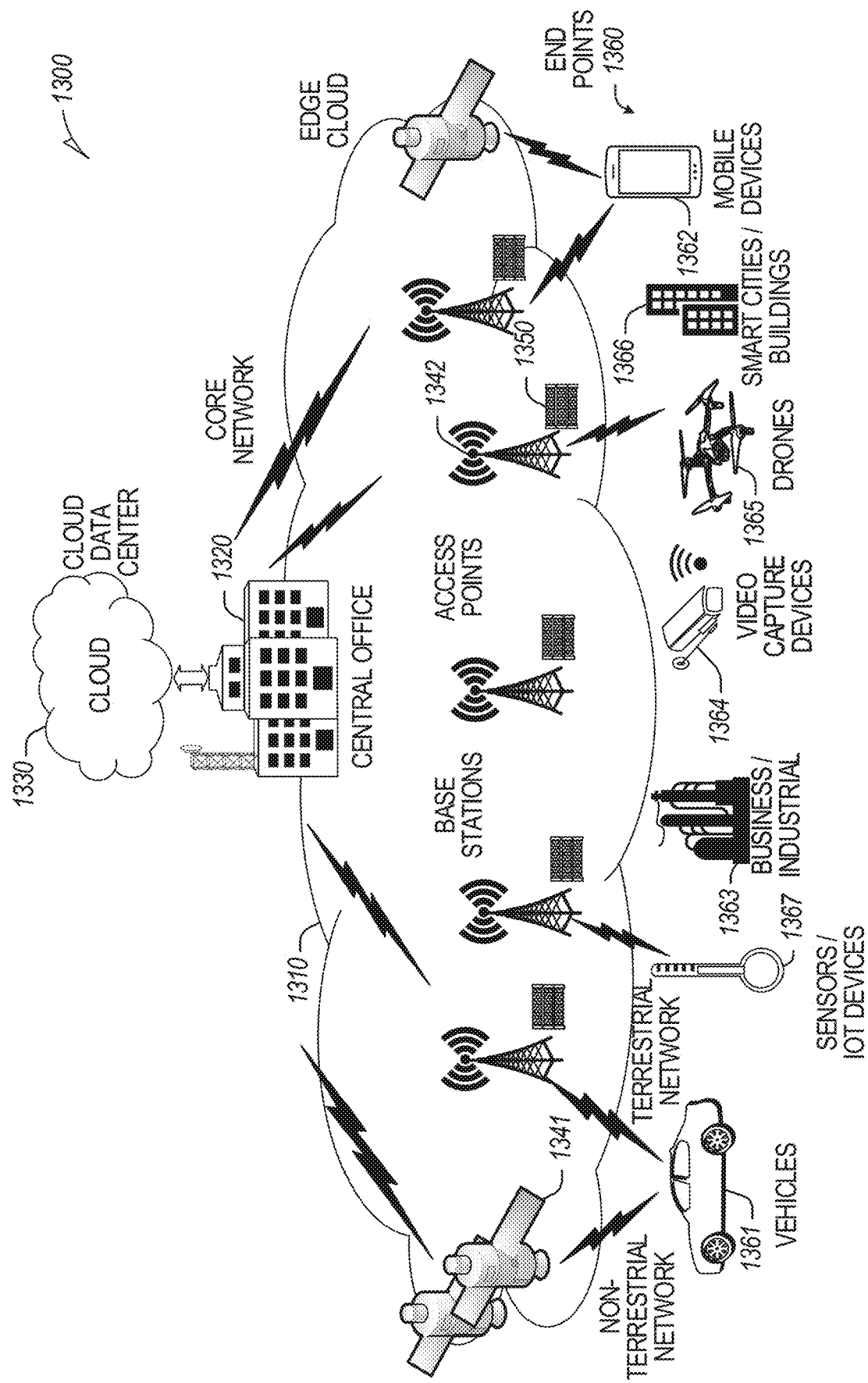
FIG. 13 illustrates an overview of an edge cloud configuration for edge computing, according to an example.

FIG. 13 is a block diagram 1300 showing an overview of a configuration for edge computing, which includes a layer of processing referenced in many of the current examples as an "edge cloud". This network topology, which may include a number of conventional networking layers (including those not shown herein), may be extended through use of the secure memory management techniques and the compute and network configurations, as well as use of the satellite and non-terrestrial network communication arrangements discussed herein.

As shown, the edge cloud 1310 is co-located at an edge location, such as a satellite vehicle 1341, a base station 1340, a local processing hub 1350, or a central office 1320, and thus may include multiple entities, devices, and equipment instances. The edge cloud 1310 is located much closer to the endpoint (consumer and producer) data sources 1360 (e.g., autonomous vehicles 1361, user equipment 1362, business and industrial equipment 1363, video capture devices 1364, drones 1365, smart cities and building devices 1366, sensors and IoT devices 1367, etc.) than the cloud data center 1330. Compute, memory, and storage resources which are offered at the edges in the edge cloud 1310 are critical to providing ultra-low latency response times for services and functions used by the endpoint data sources 1360 as well as reduce network backhaul traffic from the edge cloud 1310 toward cloud data center 1330 thus improving energy consumption and overall network usages among other benefits.

Compute, memory, and storage are scarce resources, and generally decrease depending on the edge location (e.g., fewer processing resources being available at consumer end point devices than at a base station or at a central office). However, the closer that the edge location is to the endpoint (e.g., UEs), the more that space and power is constrained. Thus, edge computing, as a general design principle, attempts to minimize the amount of resources used for network services, through the distribution of more resources which are located closer both geographically and in network access time. In a scenario that contains a non-terrestrial network, the distance and latency may be far between the endpoint and the satellite, but data processing may be better accomplished at edge computing hardware in the satellite rather than using additional data connections and network backhaul to and from the cloud.

In an example, an edge cloud architecture extends beyond typical deployment limitations to address restrictions that some network operators or service providers may have in their own infrastructures. These include, variation of configurations based on the edge location (because edges at a base station level, for instance, may have more constrained performance); configurations based on the type of compute, memory, storage, fabric, acceleration, or like resources available to edge locations, tiers of locations, or groups of locations; the service, security, and management and orchestration capabilities; and related objectives to achieve usability and performance of end services.

Edge computing is a developing paradigm where computing is performed at or closer to the "edge" of a network, typically through the use of a compute platform implemented at base stations, gateways, network routers, or other devices which are much closer to end point devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with compute hardware that performs virtualized network functions and offers compute resources for the execution of services and consumer functions for connected devices. Likewise, within edge computing deployments, there may be scenarios in services which the compute resource will be "moved" to the data, as well as scenarios in which the data will be "moved" to the compute resource. Or as an example, base station (or satellite vehicle) compute, acceleration and network resources can provide services in order to scale to workload demands on an as desired basis by activating dormant capacity (subscription, capacity on demand) in order to manage corner cases, emergencies or to provide longevity for deployed resources over a significantly longer implemented lifecycle. These and other scenarios may be enhanced with the use of microservices and secure data management and sharing.

In contrast to the network architecture of FIG. 13, traditional endpoint (e.g., UE, vehicle-to-vehicle (V2V), vehicle-to-everything (V2X), etc.) applications are reliant on local device or remote cloud data storage and processing to exchange and coordinate information. A cloud data arrangement allows for long-term data collection and storage, but is not optimal for highly time varying data, such as a collision, traffic light change, etc. and may fail in attempting to meet latency challenges. The extension of satellite capabilities within an edge computing network provides even more possible permutations of managing compute, data, bandwidth, resources, service levels, and the like.

Depending on the real-time requirements in a communications context, a hierarchical structure of data processing and storage nodes may be defined in an edge computing deployment. For example, such a deployment may include local ultra-low-latency processing, regional storage and processing as well as remote cloud data-center based storage and processing. Key performance indicators (KPIs) may be used to identify where sensor data is best transferred and where it is processed or stored. This typically depends on the ISO layer dependency of the data. For example, lower layer (PHY, MAC, routing, etc.) data typically changes quickly and is better handled locally in order to meet latency requirements. Higher layer data such as Application Layer data is typically less time critical and may be stored and processed in a remote cloud data-center.

Figure 14:
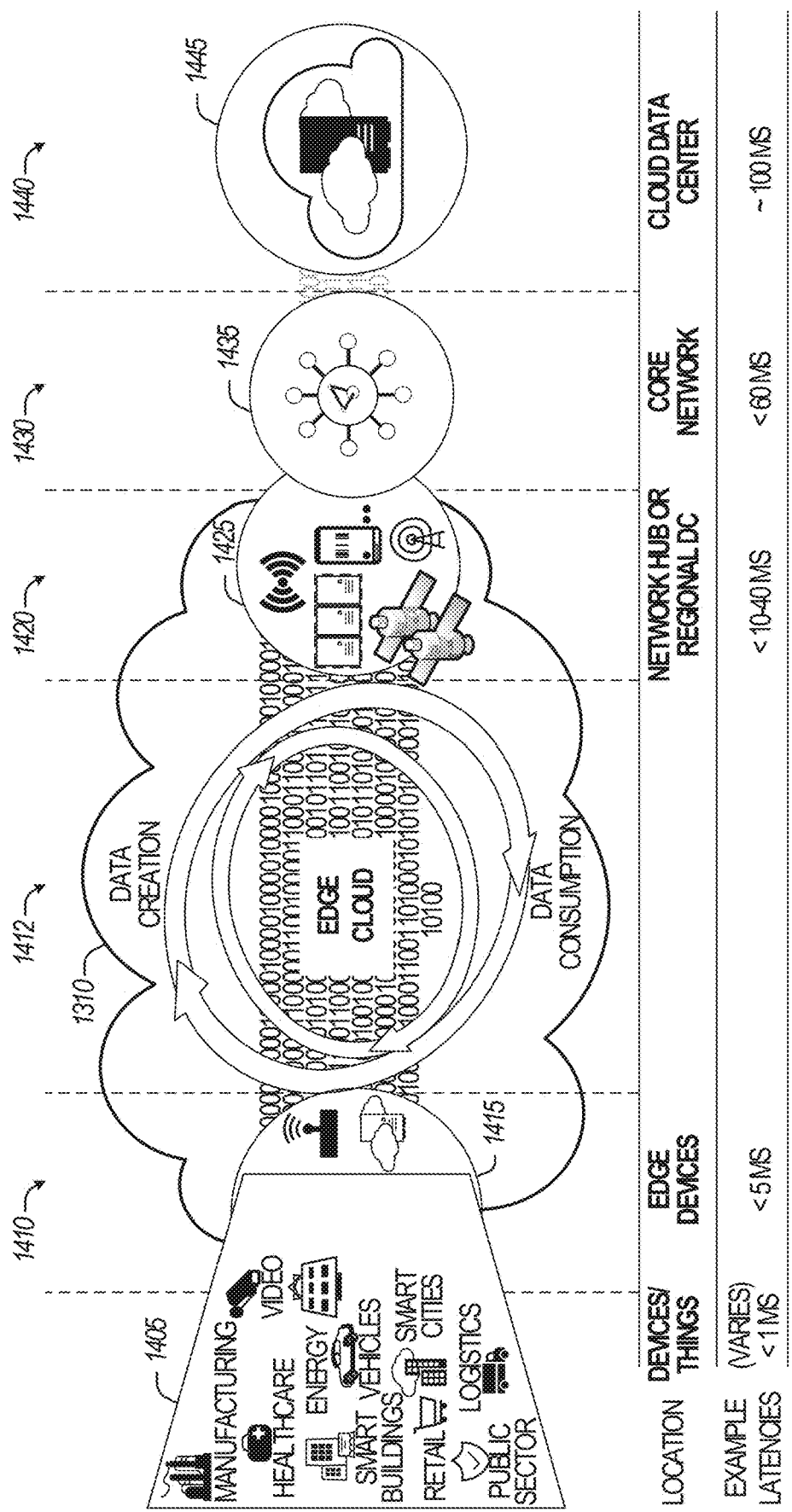
FIG. 14 illustrates an overview of layers of distributed compute deployed among an edge computing system, according to an example.

FIG. 14 illustrates operational layers among endpoints, an edge cloud, and cloud computing environments. Specifically, FIG. 14 depicts examples of computational use cases 1405, utilizing the edge cloud 1310 among multiple illustrative layers of network computing. The layers begin at an endpoint (devices and things) layer 1400, which accesses the edge cloud 1310 to conduct data creation, analysis, and data consumption activities. The edge cloud 1310 may span multiple network layers, such as an edge devices layer 1410 having gateways, on-premise servers, or network equipment (nodes 1415) located in physically proximate edge systems; a network access layer 1420, encompassing base stations, radio processing units, network hubs, regional data centers (DC), or local network equipment (equipment 1425); and any equipment, devices, or nodes located therebetween (in layer 1412, not illustrated in detail). The network communications within the edge cloud 1310 and among the various layers may occur via any number of wired or wireless mediums, including via connectivity architectures and technologies not depicted.

Examples of latency with terrestrial networks, resulting from network communication distance and processing time constraints, may range from less than a millisecond (ms) when among the endpoint layer 1400, under 5 ms at the edge devices layer 1410, to even between 15 to 40 ms when communicating with nodes at the network access layer 1420. Variation in these latencies is expected with use of non-terrestrial networks. Beyond the edge cloud 1310 are core network 1430 and cloud data center 1440 layers, each with increasing latency (e.g., between 50-60 ms at the core network layer 1430, to 150 or more ms at the cloud data center layer). As a result, operations at a core network data center 1435 or a cloud data center 1445, with latencies of at least 50 to 150 ms or more, will not be able to accomplish many time-critical functions of the use cases 1405. Each of these latency values are provided for purposes of illustration and contrast; it will be understood that the use of other access network mediums and technologies may further reduce the latencies. In some examples, respective portions of the network may be categorized as "close edge". "local edge". "near edge", "middle edge", or "far edge" layers, relative to a network source and destination. For instance, from the perspective of the core network data center 1435 or a cloud data center 1445, a central office or content data network may be considered as being located within a "near edge" layer ("near" to the cloud, having high latency values when communicating with the devices and endpoints of the use cases 1405), whereas an access point, base station, on-premise server, or network gateway may be considered as located within a "far edge" layer ("far" from the cloud, having low latency values when communicating with the devices and endpoints of the use cases 1405). It will be understood that other categorizations of a particular network layer as constituting a "close". "local", "near", "middle", or "far" edge may be based on latency, distance, number of network hops, or other measurable characteristics, as measured from a source in any of the network layers 1400-1440.

The various use cases 1405 may access resources under usage pressure from incoming streams, due to multiple services utilizing the edge cloud. To achieve results with low latency, the services executed within the edge cloud 1310 balance varying requirements in terms of: (a) Priority (throughput or latency) and Quality of Service (QoS)(e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams are to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 1310 may provide the ability to serve and respond to multiple applications of the use cases 1405 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), etc.), which cannot leverage conventional cloud computing due to latency or other limitations. This is especially relevant for applications that use connection via satellite, and the additional latency that trips via satellite would use to the cloud.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage is to be accounted for by the applications that are consuming the most power. There may be inherent power-performance tradeoffs in these pooled memory resources, as many of them are likely to use emerging memory technologies, where more power goes hand in hand with greater memory bandwidth. Likewise, improved security of hardware and root of trust trusted functions may be used, because edge locations may be unmanned and may even use permissioned access (e.g., when housed in a third-party location). Such issues are magnified in the edge cloud 1310 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 1310 (network layers 1400-1440), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, circuitry, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 1310.

As such, the edge cloud 1310 is formed from network components and functional features operated by and within edge gateway nodes, edge aggregation nodes, or other edge compute nodes among network layers 1410-1430. The edge cloud 1310 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 1310 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 4G/5G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 1310 may be servers, multi-tenant servers, appliance computing devices, and/or any other type of computing devices. For example, a node of the edge cloud 1310 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose, yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with other figures herein. The edge cloud 1310 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 15:
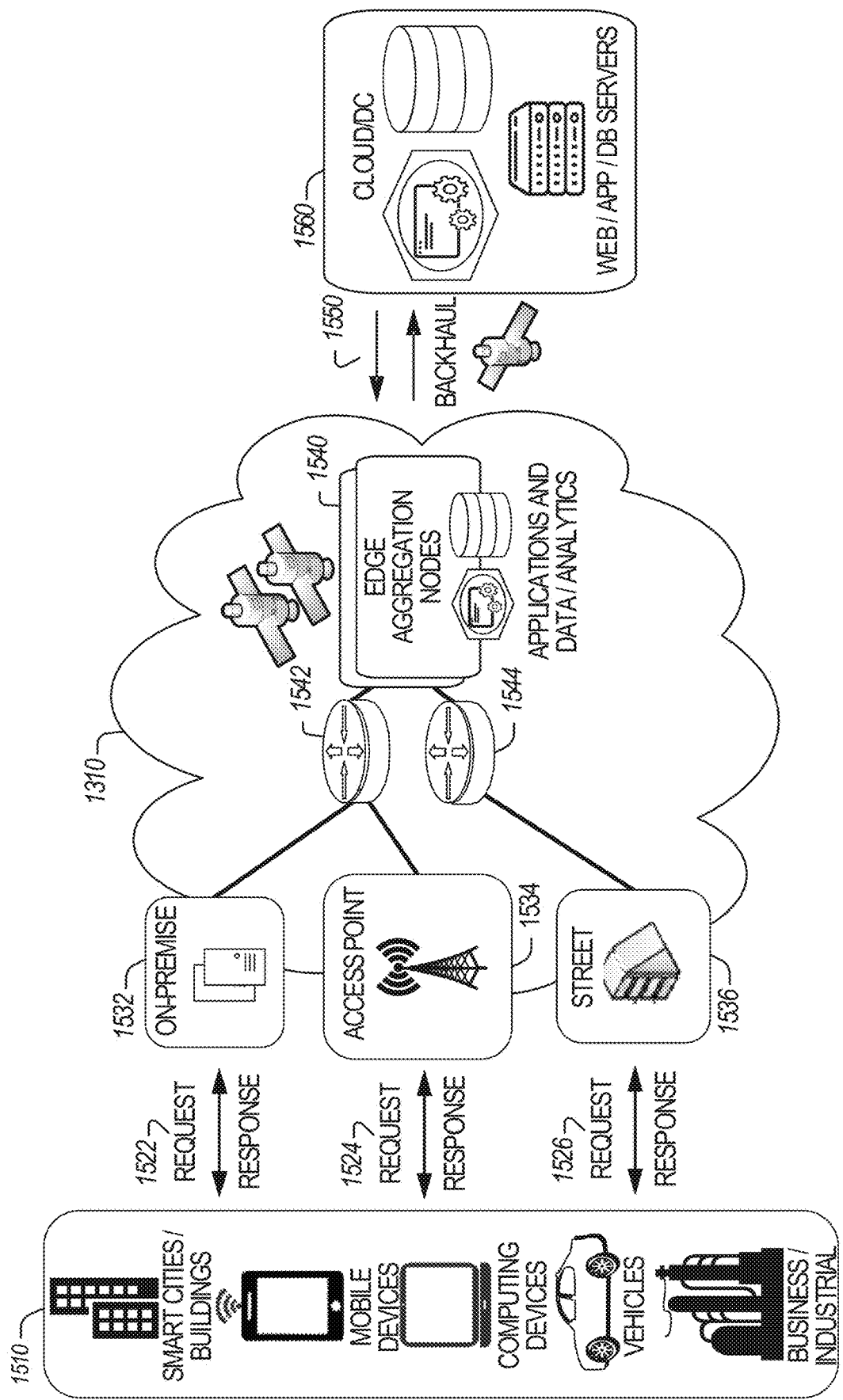
FIG. 15 illustrates operational layers among endpoints, an edge cloud, and cloud computing environments, according to an example.

In FIG. 15, various client endpoints 1510 (in the form of mobile devices, computers, autonomous vehicles, business computing equipment, industrial processing equipment) exchange requests and responses that are specific to the type of endpoint network aggregation. For instance, client endpoints 1510 may obtain network access via a wired broadband network by exchanging requests and responses 1522 through an on-premise network system 132. Some client endpoints 1510, such as mobile computing devices, may obtain network access via a wireless broadband network, by exchanging requests and responses 1524 through an access point (e.g., cellular network tower) 1534. Some client endpoints 1510, such as autonomous vehicles may obtain network access for requests and responses 1526 via a wireless vehicular network through a street-located network system 1536. However, regardless of the type of network access, the TSP may deploy aggregation points 1542, 1544 within the edge cloud 1510 to aggregate traffic and requests. Thus, within the edge cloud 1310, the TSP may deploy various compute and storage resources, such as at edge aggregation nodes 1540 (including those located at satellite vehicles), to provide requested content. The edge aggregation nodes 1540 and other systems of the edge cloud 1310 are connected to a cloud or data center 1560, which uses a backhaul network 1550 (such as a satellite backhaul) to fulfill higher-latency requests from a cloud/data center for websites, applications, database servers, etc. Additional or consolidated instances of the edge aggregation nodes 1540 and the aggregation points 1542, 1544, including those deployed on a single server framework, may also be present within the edge cloud 1310 or other areas of the TSP infrastructure.

Figure 16:
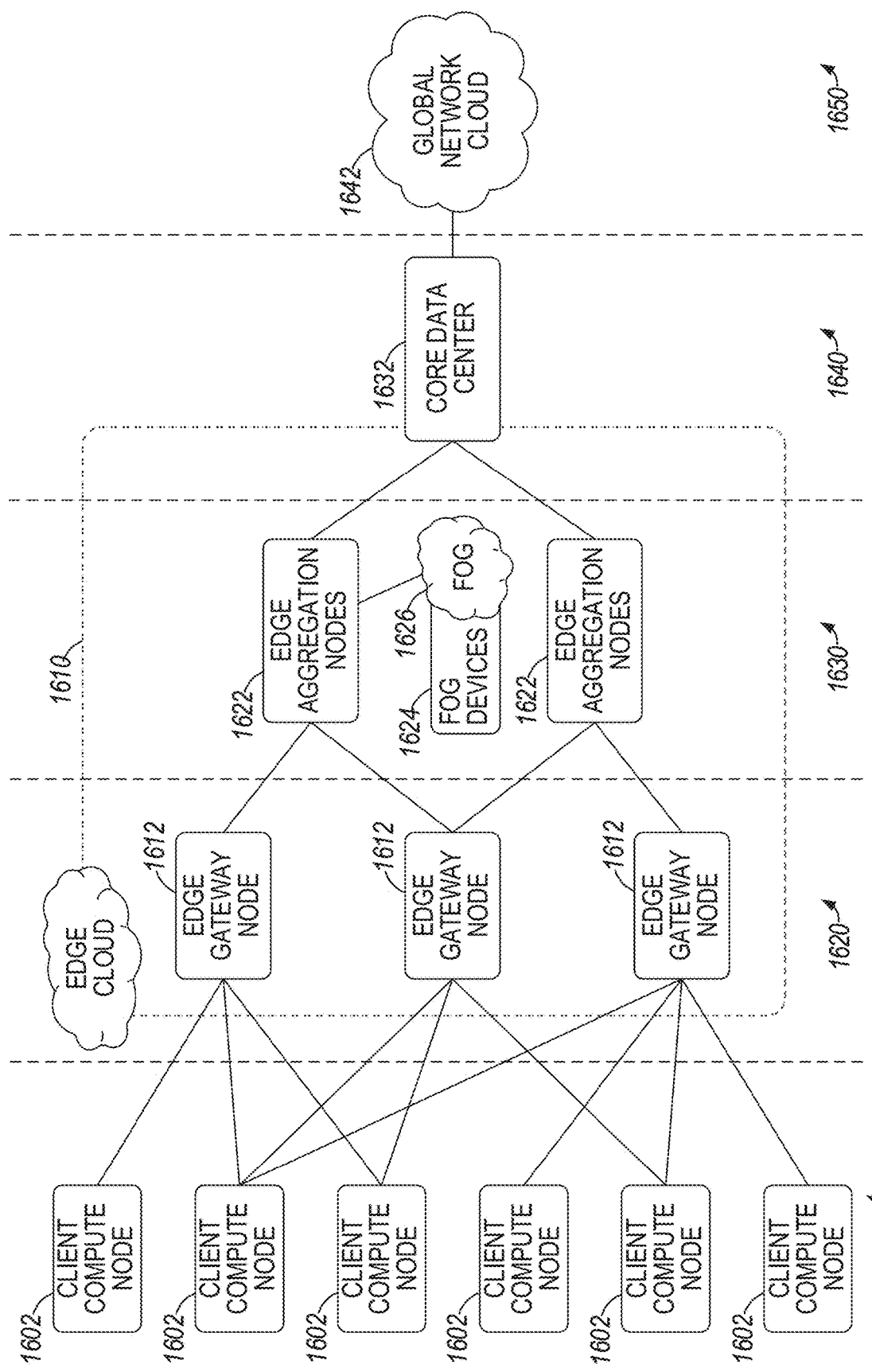
FIG. 16 illustrates an example approach for networking and services in an edge computing system, according to an example.

At a more generic level, an edge computing system may be described to encompass any number of deployments operating in the edge cloud 1310, which provide coordination from client and distributed computing devices. FIG. 16 provides a further abstracted overview of layers of distributed compute deployed among an edge computing environment for purposes of illustration.

FIG. 16 generically depicts an edge computing system for providing edge services and applications to multi-stakeholder entities, as distributed among one or more client compute nodes 1602, one or more edge gateway nodes 1612, one or more edge aggregation nodes 1622, one or more core data centers 1632, and a global network cloud 1642, as distributed across layers of the network. The implementation of the edge computing system may be provided at or on behalf of a telecommunication service provider ("telco", or "TSP"), internet-of-things service provider, cloud service provider (CSP), enterprise entity, or any other number of entities.

Each node or device of the edge computing system is located at a particular layer corresponding to layers 1610, 1620, 1630, 1640, 1650. For example, the client compute nodes 1602 are each located at an endpoint layer 1610, while each of the edge gateway nodes 1612 are located at an edge devices layer 1620 (local level) of the edge computing system. Additionally, each of the edge aggregation nodes 1622 (and/or fog devices 1624, if arranged or operated with or among a fog networking configuration 1626) are located at a network access layer 1630 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with edge computing as discussed herein; many of the edge computing aspects discussed herein are applicable to fog networks, fogging, and fog configurations. Further, aspects of the edge computing systems discussed herein may be configured as a fog, or aspects of a fog may be integrated into an edge computing architecture.

The core data center 1632 is located at a core network layer 1640 (e.g., a regional or geographically-central level), while the global network cloud 1642 is located at a cloud data center layer 1650 (e.g., a national or global layer). The use of "core" is provided as a term for a centralized network location-deeper in the network-which is accessible by multiple edge nodes or components; however, a "core" does not necessarily designate the "center" or the deepest location of the network. Accordingly, the core data center 1632 may be located within, at, or near the edge cloud 1310.

Although an illustrative number of client compute nodes 1602, edge gateway nodes 1612, edge aggregation nodes 1622, core data centers 1632, global network clouds 1642 are shown in FIG. 16, it should be appreciated that the edge computing system may include more or fewer devices or systems at each layer. Additionally, as shown in FIG. 16, the number of components of each layer 1610, 1620, 1630, 1640, 1650 generally increases at each lower level (i.e., when moving closer to endpoints). As such, one edge gateway node 1612 may service multiple client compute nodes 1602, and one edge aggregation node 1622 may service multiple edge gateway nodes 1612.

Consistent with the examples provided herein, each client compute node 1602 may be embodied as any type of end point component, device, appliance, or "thing" capable of communicating as a producer or consumer of data. Further, the label "node" or "device" as used in the edge computing system 1600 does not necessarily mean that such node or device operates in a client or agent/minion/follower role; rather, any of the nodes or devices in the edge computing system 1600 refer to individual entities, nodes, or subsystems which include discrete or connected hardware or software configurations to facilitate or use the edge cloud 1310.

As such, the edge cloud 1310 is formed from network components and functional features operated by and within the edge gateway nodes 1612 and the edge aggregation nodes 1622 of layers 1620, 1630, respectively. The edge cloud 1310 may be embodied as any type of network that provides edge computing and/or storage resources which are proximately located to radio access network (RAN) capable endpoint devices (e.g., mobile computing devices, IoT devices, smart devices, etc.), which are shown in FIG. 16 as the client compute nodes 1602. In other words, the edge cloud 1310 may be envisioned as an "edge" which connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the edge cloud 1310 may forma portion of or otherwise provide an ingress point into or across a fog networking configuration 1626 (e.g., a network of fog devices 1624, not shown in detail), which may be embodied as a system-level horizontal and distributed architecture that distributes resources and services to perform a specific function. For instance, a coordinated and distributed network of fog devices 1624 may perform computing, storage, control, or networking aspects in the context of an IoT system arrangement. Other networked, aggregated, and distributed functions may exist in the edge cloud 1310 between the cloud data center layer 1650 and the client endpoints (e.g., client compute nodes 1602). Some of these are discussed in the following sections in the context of network functions or service virtualization, including the use of virtual edges and virtual services which are orchestrated for multiple stakeholders.

The edge gateway nodes 1612 and the edge aggregation nodes 1622 cooperate to provide various edge services and security to the client compute nodes 1602. Furthermore, because each client compute node 1602 may be stationary or mobile, each edge gateway node 1612 may cooperate with other edge gateway devices to propagate presently provided edge services and security as the corresponding client compute node 1602 moves about a region. To do so, each of the edge gateway nodes 1612 and/or edge aggregation nodes 1622 may support multiple tenancy and multiple stakeholder configurations, in which services from (or hosted for) multiple service providers and multiple consumers may be supported and coordinated across a single or multiple compute devices.

In further examples, any of the compute nodes or devices discussed with reference to the present edge computing systems and environment may be fulfilled based on the components depicted in FIGS. 17A and 17B. Each edge compute node may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g., a navigation system), or other device or system capable of performing the described functions.

Figure 17A:
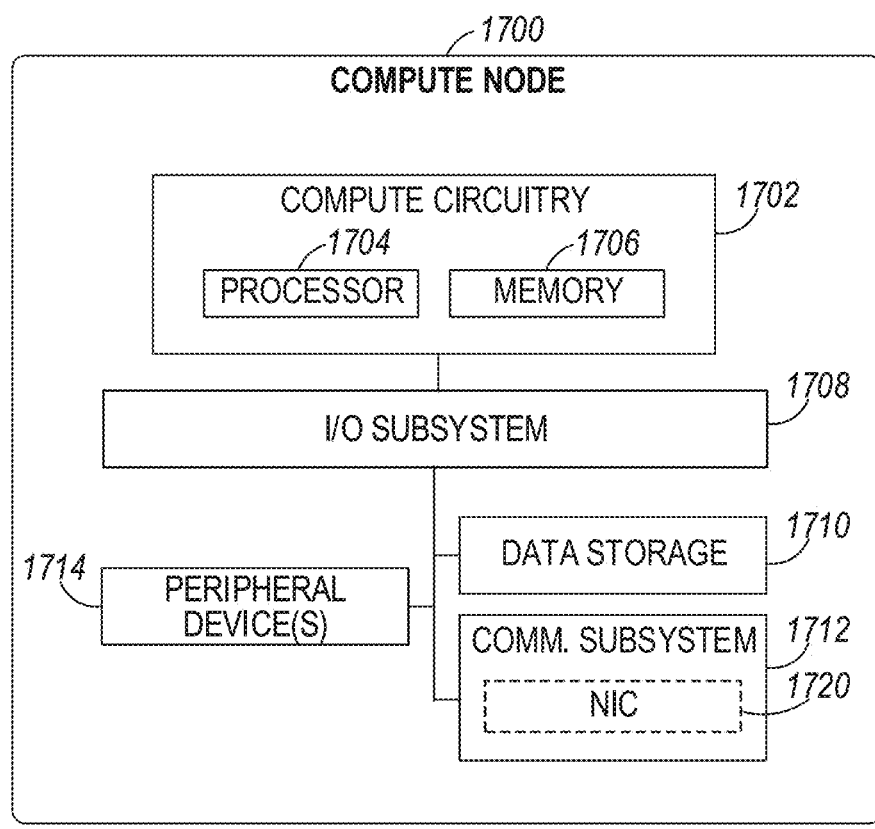
FIG. 17A illustrates an overview of example components deployed at a compute node system, according to an example.

In the simplified example depicted in FIG. 17A, an edge compute node 1700 includes a compute engine (also referred to herein as "compute circuitry") 1702, an input/output (I/O) subsystem 1708, data storage 1710, a communication circuitry subsystem 1712, and, optionally, one or more peripheral devices 1714. In other examples, each compute device may include other or additional components, such as those used in personal or server computing systems (e.g., a display, peripheral devices, etc.). Additionally, in some examples, one or more of the illustrative components may be incorporated in, or otherwise form a portion of, another component.

The compute node 1700 may be embodied as any type of engine, device, or collection of devices capable of performing various compute functions. In some examples, the compute node 1700 may be embodied as a single device such as an integrated circuit, an embedded system, a field-programmable gate array (FPGA), a system-on-a-chip (SOC), or other integrated system or device. In the illustrative example, the compute node 1700 includes or is embodied as a processor 1704 and a memory 1706. The processor 1704 may be embodied as any type of processor capable of performing the functions described herein (e.g., executing an application). For example, the processor 1704 may be embodied as a multi-core processor(s), a microcontroller, or other processor or processing/controlling circuit. In some examples, the processor 1704 may be embodied as, include, or be coupled to an FPGA, an application specific integrated circuit (ASIC), reconfigurable hardware or hardware circuitry, or other specialized hardware to facilitate performance of the functions described herein.

The main memory 1706 may be embodied as any type of volatile (e.g., dynamic random-access memory (DRAM), etc.) or non-volatile memory or data storage capable of performing the functions described herein. Volatile memory may be a storage medium that uses power to maintain the state of data stored by the medium. Non-limiting examples of volatile memory may include various types of random-access memory (RAM), such as DRAM or static random-access memory (SRAM). One particular type of DRAM that may be used in a memory module is synchronous dynamic random-access memory (SDRAM).

In one example, the memory device is a block addressable memory device, such as those based on NAND or NOR technologies. A memory device may also include a three-dimensional crosspoint memory device (e.g., Intel 3D XPoint™ memory), or other byte addressable write-in-place nonvolatile memory devices. The memory device may refer to the die itself and/or to a packaged memory product. In some examples, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the main memory 1706 may be integrated into the processor 1704. The main memory 1706 may store various software and data used during operation such as one or more applications, data operated on by the application(s), libraries, and drivers.

The compute circuitry 1702 is communicatively coupled to other components of the compute node 1700 via the I/O subsystem 1708, which may be embodied as circuitry and/or components to facilitate input/output operations with the compute circuitry 1702 (e.g., with the processor 1704 and/or the main memory 1706) and other components of the compute circuitry 1702. For example, the I/O subsystem 1708 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1708 may form a portion of a system-on-a-chip (SoC) and be incorporated, along with one or more of the processor 1704, the main memory 1706, and other components of the compute circuitry 1702, into the compute circuitry 1702.

The one or more illustrative data storage devices 1710 may be embodied as any type of devices configured for short-term or long-term storage of data such as, for example, memory devices and circuits, memory cards, hard disk drives, solid-state drives, or other data storage devices. Each data storage device 1710 may include a system partition that stores data and firmware code for the data storage device 1710. Each data storage device 1710 may also include one or more operating system partitions that store data files and executables for operating systems depending on, for example, the type of compute node 1700.

The communication circuitry 1712 may be embodied as any communication circuit, device, or collection thereof, capable of enabling communications over a network between the compute circuitry 1702 and another compute device (e.g., an edge gateway node 1712 of the edge computing system 1700). The communication circuitry 1712 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, etc.) to effect such communication.

The illustrative communication circuitry 1712 includes a network interface controller (NIC) 1720, which may also be referred to as a host fabric interface (HFI). The NIC 1720 may be embodied as one or more add-in-boards, daughter cards, network interface cards, controller chips, chipsets, or other devices that may be used by the compute node 1700 to connect with another compute device (e.g., an edge gateway node 1612). In some examples, the NIC 1720 may be embodied as part of a system-on-a-chip (SoC) that includes one or more processors, or included on a multichip package that also contains one or more processors. In some examples, the NIC 1720 may include a local processor (not shown) and/or a local memory (not shown) that are both local to the NIC 1720. In such examples, the local processor of the NIC 1720 may be capable of performing one or more of the functions of the compute circuitry 1720 described herein. Additionally or alternatively, in such examples, the local memory of the NIC 1720 may be integrated into one or more components of the client compute node at the board level, socket level, chip level, and/or other levels.

Additionally, in some examples, each compute node 1700 may include one or more peripheral devices 1714. Such peripheral devices 1714 may include any type of peripheral device found in a compute device or server such as audio input devices, a display, other input/output devices, interface devices, and/or other peripheral devices, depending on the particular type of the compute node 1700. In further examples, the compute node 1700 may be embodied by a respective edge compute node in an edge computing system (e.g., client compute node 1702, edge gateway node 1712, edge aggregation node 1722) or like forms of appliances, computers, subsystems, circuitry, or other components.

Figure 17B:
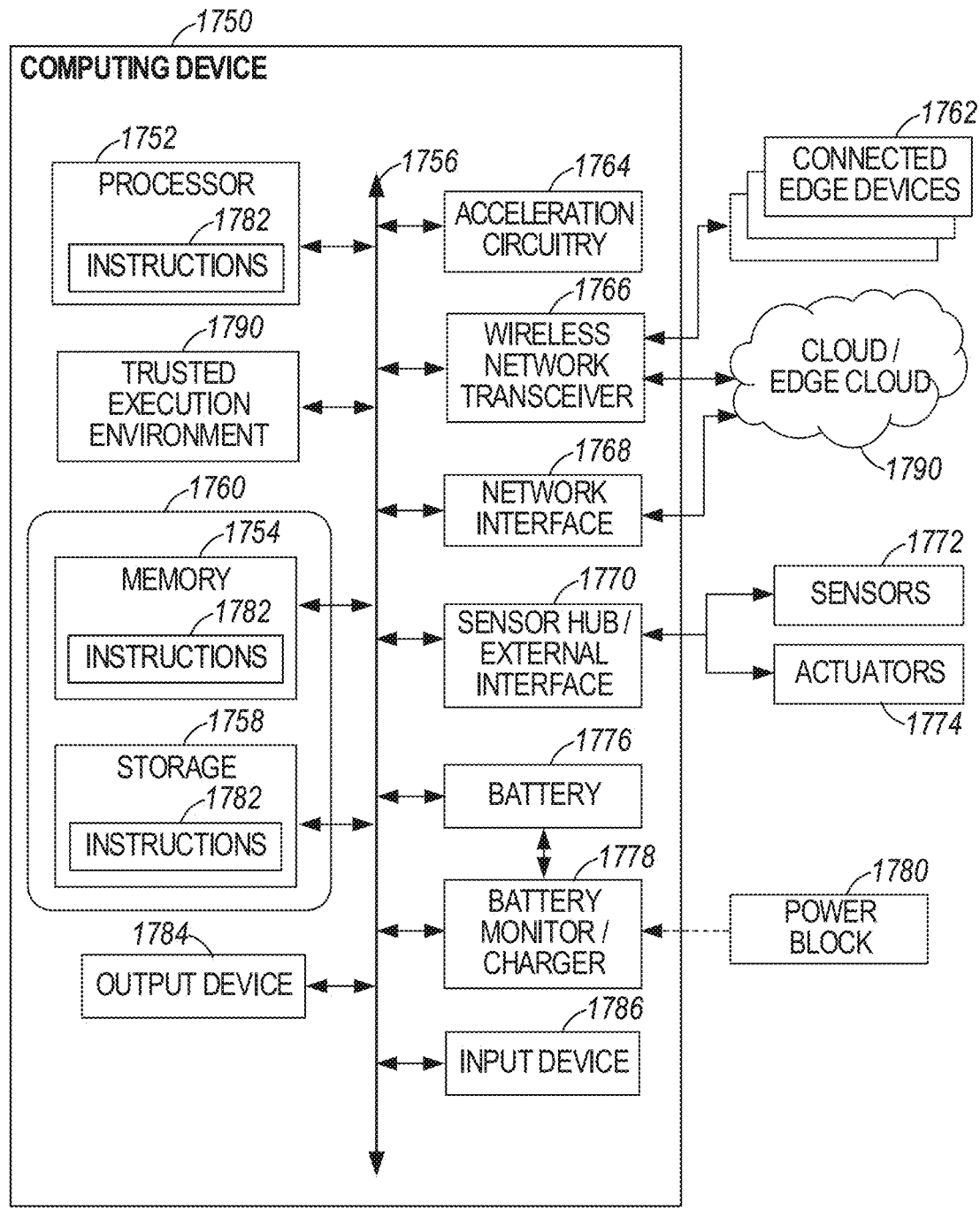
FIG. 17B illustrates a further overview of example components within a computing device, according to an example.

In a more detailed example, FIG. 17B illustrates a block diagram of an example of components that may be present in an edge computing node 1750 for implementing the techniques (e.g., operations, processes, methods, and methodologies) described herein. The edge computing node 1750 may include any combinations of the components referenced above, and it may include any device usable with an edge communication network or a combination of such networks. The components may be implemented as ICs, portions thereof, discrete electronic devices, or other modules, logic, hardware, software, firmware, or a combination thereof adapted in the edge computing node 1750, or as components otherwise incorporated within a chassis of a larger system. Further, to support the security examples provided herein, a hardware RoT (e.g., provided according to a DICE architecture) may be implemented in each IP block of the edge computing node 1750 such that any IP Block could boot into a mode where a RoT identity could be generated that may attest its identity and its current booted firmware to another IP Block or to an external entity.

The edge computing node 1750 may include processing circuitry in the form of a processor 1752, which may be a microprocessor, a multi-core processor, a multithreaded processor, an ultra-low voltage processor, an embedded processor, or other known processing elements. The processor 1752 may be a part of a system on a chip (SoC) in which the processor 1752 and other components are formed into a single integrated circuit, or a single package, such as the Edison™ or Galileo™ SoC boards from Intel Corporation. Santa Clara. Calif. As an example, the processor 1752 may include an Intel® Architecture Core™ based processor, such as a Quark™, an Atom™, a Xeon™, an i3, an i5, an i7, an i9, or an MCU-class processor, or another such processor available from Intel®). However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or a customer thereof, or their licensees or adopters. The processors may include units such as an A5-A13 processor from Applet Inc., a Snapdragon™ processor from QualcommX Technologies, Inc., or an OMAP™ processor from Texas Instruments, Inc.

The processor 1752 may communicate with a system memory 1754 over an interconnect 1756 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1758 may also couple to the processor 1752 via the interconnect 1756. In an example, the storage 1758 may be implemented via a solid-state disk drive (SSDD). Other devices that may be used for the storage 1758 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magneto-resistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 1758 may be on-die memory or registers associated with the processor 1752. However, in some examples, the storage 1758 may be implemented using a micro hard disk drive (HDD). Further, any number of new technologies may be used for the storage 1758 in addition to, or instead of, the technologies described, such resistance change memories, phase change memories, holographic memories, or chemical memories, among others.

The components may communicate over the interconnect 1756. The interconnect 1756 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1756 may be a proprietary bus, for example, used in an SoC based system. Other bus systems may be included, such as an I2C interface, an SPI interface, point to point interfaces, and a power bus, among others.

The interconnect 1756 may couple the processor 1752 to a transceiver 1766, for communications with the connected edge devices 1762. The transceiver 1766 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBeek standard, among others. Any number of radios, configured for a particular wireless communication protocol, may be used for the connections to the connected edge devices 1762. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1766 (or multiple transceivers) may communicate using multiple standards or radios for communications at a different range. For example, the edge computing node 1750 may communicate with close devices, e.g., within about 10 meters, using a local transceiver based on BLE, or another low power radio, to save power. More distant connected edge devices 1762, e.g., within about 50 meters, may be reached over ZigBee or other intermediate power radios. Both communications techniques may take place over a single radio at different power levels or may take place over separate transceivers, for example, a local transceiver using BLE and a separate mesh transceiver using ZigBee.

A wireless network transceiver 1766 (e.g., a radio transceiver) may be included to communicate with devices or services in the edge cloud 1790 via local or wide area network protocols. The wireless network transceiver 1766 may be an LPWA transceiver that follows the IEEE 802.15.4, or IEEE 802.15.4 g standards, among others. The edge computing node 1750 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1766, as described herein. For example, the transceiver 1766 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1766 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1768 may be included to provide a wired communication to nodes of the edge cloud 1790 or to other devices, such as the connected edge devices 1762 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1768 may be included to enable connecting to a second network, for example, a first NIC 1768 providing communications to the cloud over Ethernet, and a second NIC 1768 providing communications to other devices over another type of network.

Given the variety of types of applicable communications from the device to another component or network, applicable communications circuitry used by the device may include or be embodied by any one or more of components 1764, 1766, 1768, or 1770. Accordingly, in various examples, applicable means for communicating (e.g., receiving, transmitting, etc.) may be embodied by such communications circuitry.

The edge computing node 1750 may include or be coupled to acceleration circuitry 1764, which may be embodied by one or more AI accelerators, a neural compute stick, neuromorphic hardware, an FPGA, an arrangement of GPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. Accordingly, in various examples, applicable means for acceleration may be embodied by such acceleration circuitry.

The interconnect 1756 may couple the processor 1752 to a sensor hub or external interface 1770 that is used to connect additional devices or subsystems. The devices may include sensors 1772, such as accelerometers, level sensors, flow sensors, optical light sensors, camera sensors, temperature sensors, a global positioning system (GPS) sensors, pressure sensors, barometric pressure sensors, and the like. The hub or interface 1770 further may be used to connect the edge computing node 1750 to actuators 1774, such as power switches, valve actuators, an audible sound generator, a visual warning device, and the like.

In some optional examples, various input/output (I/O) devices may be present within or connected to, the edge computing node 1750. For example, a display or other output device 1784 may be included to show information, such as sensor readings or actuator position. An input device 1786, such as a touch screen or keypad may be included to accept input. An output device 1784 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the edge computing node 1750.

A battery 1776 may power the edge computing node 1750, although, in examples in which the edge computing node 1750 is mounted in a fixed location, it may have a power supply coupled to an electrical grid. The battery 1776 may be a lithium ion battery, or a metal-air battery, such as a zinc-air battery, an aluminum-air battery, a lithium-air battery, and the like.

A battery monitor/charger 1778 may be included in the edge computing node 1750 to track the state of charge (SoCh) of the battery 1776. The battery monitor/charger 1778 may be used to monitor other parameters of the battery 1776 to provide failure predictions, such as the state of health (SoH) and the state of function (SoF) of the battery 1776. The battery monitor/charger 1778 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1778 may communicate the information on the battery 1776 to the processor 1752 over the interconnect 1756. The battery monitor/charger 1778 may also include an analog-to-digital (ADC) converter that enables the processor 1752 to directly monitor the voltage of the battery 1776 or the current flow from the battery 1776. The battery parameters may be used to determine actions that the edge computing node 1750 may perform, such as transmission frequency, mesh network operation, sensing frequency, and the like.

A power block 1780, or other power supply coupled to a grid, may be coupled with the battery monitor/charger 1778 to charge the battery 1776. In some examples, the power block 1780 may be replaced with a wireless power receiver to obtain the power wirelessly, for example, through a loop antenna in the edge computing node 1750. A wireless battery charging circuit, such as an LTC4020 chip from Linear Technologies of Milpitas, Calif., among others, may be included in the battery monitor/charger 1778. The specific charging circuits may be selected based on the size of the battery 1776, and thus, the current used. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1758 may include instructions 1782 in the form of software, firmware, or hardware commands to implement the techniques described herein. Although such instructions 1782 are shown as code blocks included in the memory 1754 and the storage 1758, it may be understood that any of the code blocks may be replaced with hardwired circuits, for example, built into an application specific integrated circuit (ASIC).

In an example, the instructions 1782 provided via the memory 1754, the storage 1758, or the processor 1752 may be embodied as a non-transitory, machine-readable medium 1760 including code to direct the processor 1752 to perform electronic operations in the edge computing node 1750. The processor 1752 may access the non-transitory, machine-readable medium 1760 over the interconnect 1756. For instance, the non-transitory, machine-readable medium 1760 may be embodied by devices described for the storage 1758 or may include specific storage units such as optical disks, flash drives, or any number of other hardware devices. The non-transitory, machine-readable medium 1760 may include instructions to direct the processor 1752 to perform a specific sequence or flow of actions, for example, as described with respect to the flowchart(s) and block diagram(s) of operations and functionality depicted above. As used in, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Each of the block diagrams of FIGS. 17A and 17B are intended to depict a high-level view of components of a device, subsystem, or arrangement of an edge computing node. However, it will be understood that some of the components shown may be omitted, additional components may be present, and a different arrangement of the components shown may occur in other implementations.

Implementation of the preceding techniques may be accomplished through any number of specifications, configurations, or example deployments of hardware and software. It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Figure 18:
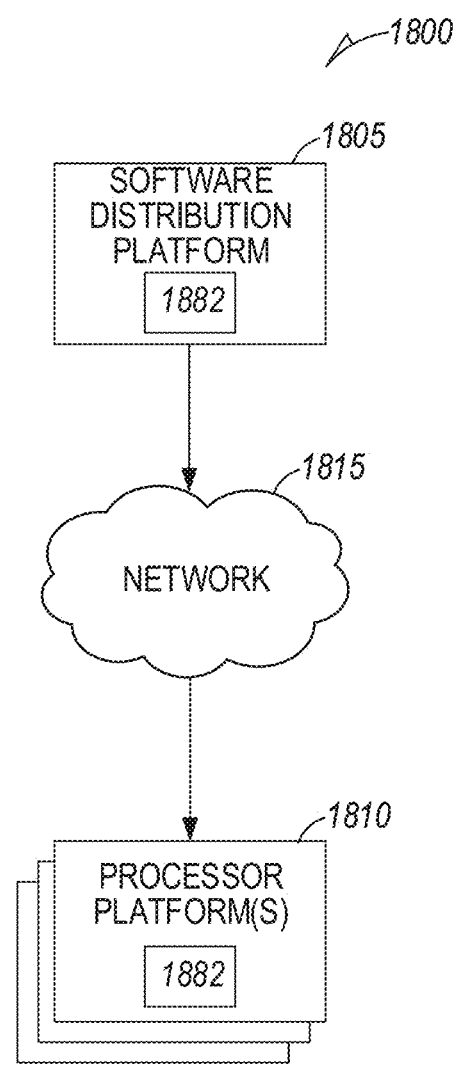
FIG. 18 illustrates a software distribution platform to distribute software instructions and derivatives, according to an example.

FIG. 18 illustrates an example software distribution platform 1805 to distribute software, such as the example computer readable instructions 1782 of FIG. 17B, to one or more devices, such as example processor platform(s) 1810 and/or other example connected edge devices or systems discussed herein. The software being distributed may include software to run some or all of the operations described above.

The example software distribution platform 1805 may be implemented by any computer server, data facility, cloud service, etc., capable of storing and transmitting software to other computing devices. Example connected edge devices may be customers, clients, managing devices (e.g., servers), third parties (e.g., customers of an entity owning and/or operating the software distribution platform 1805). Example connected edge devices may operate in commercial and/or home automation environments. In some examples, a third party is a developer, a seller, and/or a licensor of software such as the example computer readable instructions 1782 of FIG. 17B. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 18, the software distribution platform 1805 includes one or more servers and one or more storage devices that store the computer readable instructions 1782. The one or more servers of the example software distribution platform 1805 are in communication with a network 1815, which may correspond to any one or more of the Internet and/or any of the example networks described above. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 1782 from the software distribution platform 1805. For example, the software, which may correspond to example computer readable instructions, may be downloaded to the example processor platform(s), which is/are to execute the computer readable instructions 1782. In some examples, one or more servers of the software distribution platform 1805 are communicatively connected to one or more security domains and/or security devices through which requests and transmissions of the example computer readable instructions 1782 pass. In some examples, one or more servers of the software distribution platform 1805 periodically offer, transmit, and/or force updates to the software (e.g., the example computer readable instructions 1782 of FIG. 17B) to ensure improvements, patches, updates, etc. are distributed and applied to the software at the end user devices.

In the illustrated example of FIG. 18, the computer readable instructions 1782 are stored on storage devices of the software distribution platform 1805 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions 1782 stored in the software distribution platform 1805 are in a first format when transmitted to the example processor platform(s) 1810. In some examples, the first format is an executable binary in which particular types of the processor platform(s) 1810 can execute. However, in some examples, the first format is uncompiled code that uses one or more preparation tasks to transform the first format to a second format to enable execution on the example processor platform(s) 1810. For instance, the receiving processor platform(s) 1800 may compile the computer readable instructions 1782 in the first format to generate executable code in a second format that is capable of being executed on the processor platform(s) 1810. In still other examples, the first format is interpreted code that, upon reaching the processor platform(s) 1810, is interpreted by an interpreter to facilitate execution of instructions.

Examples

Example 1 is a computing device, comprising: processing circuitry configured to: receive holographic data of a hologram captured by an image sensor; calculate, for each depth of a predetermined set of depths, a free space impulse response at an impulse response precision, each depth being determined from a reference plane associated with the image sensor; calculate, at each of the depths, an image slice of the hologram from the holograph data, the image slice being calculated at a reconstruction precision that is different from the impulse response precision; and reconstruct the hologram from each of image slices and the free space impulse responses; and a memory device configured to store the free space impulse response at each depth.

In Example 2, the subject matter of Example 1 further includes that the impulse response precision is double precision and the reconstruction precision is single precision, the processing circuitry configured to calculate the free space impulse response using twice as many bits as reconstruction of the hologram.

In Example 3, the subject matter of Examples 1-2 further includes that the processing circuitry is configured to, at each of the depths: multiply a forward Fast Fourier Transform (FFT) of the free space impulse response with a forward FFT of the holographic data to form a two-dimensional (2D) matrix; and calculate an inverse FFT of each 2D matrix to represent the image slice.

In Example 4, the subject matter of Example 3 further includes that the processing circuitry is configured to, for each 2D matrix: calculate a module of the 2D matrix; and scale the module to obtain an intensity of the image slice.

In Example 5, the subject matter of Examples 3-4 further includes that the processing circuitry is configured to: set a number of first parallel threads equal to a number of the depths; set a number of second parallel threads to an integer ratio of a number of available hardware threads over the number of first parallel threads; simultaneously compute the inverse FFT of each 2D matrix on a separate first parallel thread to form the image slice; and combine the inverse FFTs to reconstruct the hologram.

In Example 6, the subject matter of Examples 1-5 further includes that the processing circuitry is configured to subtract a reference image from each image slice to correct for at least one of non-uniformities in illumination of an object forming the hologram or imperfections in a device providing the object for illumination.

In Example 7, the subject matter of Example 6 further includes that the processing circuitry is configured to: select a threshold to convert each image slice from a grayscale image slice to a binarized image slice having features limited to black and white; combine the binarized image slices by at least one of: use of a logical "or" operation to form a two-dimensional (2D) representation of the object, or placement of the binarized image slices in a three-dimensional (3D) array that represents a scanned volume of the object to form a 3D representation of the object; fill holes of detected toroids in, and perform segregation of, at least one of the 2D representation of the object to form a 2D segmented object or the 3D representation of the object to form a 3D segmented object; and at least one of count or size particles in at least one of the 2D segmented object or the 3D segmented object.

In Example 8, the subject matter of Example 7 further includes that the processing circuitry is configured to: determine whether to limit processing in at least one successive image frame from a current image frame further includes that the hologram has been captured; and to determine whether to limit processing in the at least one successive image frame: evaluate a difference between the count and size of the particles in the 2D segmented object and the count and size of the particles in the 3D segmented object; and in response to a determination that the difference is less than a predetermined threshold difference, limit combination of binarized image slices to formation of a 2D representation of an object in the at least one successive image frame without formation of a 3D representation of the object in the at least one successive image frame.

In Example 9, the subject matter of Example 8 further includes that to determine whether to limit processing in the at least one successive image frame, the processing circuitry is further configured to: determine, in each of the at least one successive frame, whether a pre-set time interval has elapsed from a time when the combination of the binarized image slices was limited; in response to a determination that the pre-set time interval has not elapsed, continue to limit processing in the at least one successive image frame, and in response to a determination that the pre-set time interval has elapsed, determine, based on the next image frame after the determination that the pre-set time interval has elapsed, whether to again limit processing in at least one successive image frame after the next image frame.

In Example 10, the subject matter of Examples 1-9 further includes that the processing circuitry is configured to calculate the free space impulse responses prior to reconstruction of the hologram.

In Example 11, the subject matter of Examples 1-10 further includes that the hologram is captured after calculation of the free space impulse responses.

In Example 12, the subject matter of Examples 1-11 further includes that the processing circuitry is configured to calculate the free space impulse responses and reconstruct the hologram without using graphics processing unit (GPU) acceleration.

In Example 13, the subject matter of Examples 1-12 further includes that the processing circuitry is configured to calculate the free space impulse responses and reconstruct the hologram at a rate of at least 20 frames per second.

In Example 14, the subject matter of Examples 1-13 further includes that the processing circuitry is configured to at least one of perform particle detection, particle count or particle sizing from a reconstruction of a 3D hologram.

Example 15 is anon-transitory device-readable storage medium including instructions that, when executed by processing circuitry, cause the processing circuitry to perform operations, the operations comprising: calculating, for each of a predetermined set of depths, a free space impulse response at double precision, each of the depths being determined from a reference plane; capturing, at an image sensor, a hologram after calculating the free space impulse responses, the reference plane associated with the image sensor; calculating, at single precision, a forward Fast Fourier Transform (FFT) of the hologram at each of the depths; multiplying, at each of the depths, a forward FFT of the free space impulse response at the depth with the forward FFT of the hologram at the depth to form a two-dimensional (2D) matrix; calculating, for each depth, an inverse FFT of the 2D matrix to form an image slice at the depth; and combining the image slice from each of the depths to reconstruct the hologram in at least one of a combined 2D or 3D array.

In Example 16, the subject matter of Example 15 further includes that the instructions, when executed by the processing circuitry, cause the processing circuitry to perform further operations comprising: setting a number of first parallel threads equal to a number of the depths; setting a number of second parallel threads to an integer ratio of a number of available hardware threads over the number of first parallel threads; and simultaneously computing the inverse FFT of each 2D matrix on a separate first parallel thread to form each image slice.

In Example 17, the subject matter of Example 16 further includes that the instructions, when executed by the processing circuitry, cause the processing circuitry to perform further operations comprising: subtracting a reference image slice from each image slice to form a grayscale image slice; and selecting a threshold to convert each grayscale image slice from grayscale to a binarized image slice having features limited to black and white.

In Example 18, the subject matter of Example 17 further includes that the instructions, when executed by the processing circuitry, cause the processing circuitry to perform further operations comprising: combining the binarized image slices by at least one of: using a logical "or" operation to form a 2D representation of the hologram, or placement of the binarized image slices in a 3D array to form a 3D representation of the hologram; fill holes of detected toroids in, and perform segregation of, at least one of the 2D representation of the hologram to form a 2D segmented hologram or the 3D representation of the hologram to form a 3D segmented hologram; and at least one of count or size particles in at least one of the 2D segmented hologram or the 3D segmented hologram.

In Example 19, the subject matter of Example 18 further includes that the instructions, when executed by the processing circuitry, cause the processing circuitry to perform further operations comprising determining whether to limit processing in at least one successive image frame from a current image frame further includes that the hologram has been captured by: evaluating a difference between the count and size of the particles in the 2D segmented hologram and the count and size of the particles in the 3D segmented hologram; in response to a determination that the difference is less than a predetermined threshold difference, limiting combination of binarized image slices to only formation of a 2D representation of a hologram in the at least one successive image frame determining, in each of the at least one successive frame, whether a pre-set time interval has elapsed from a time when the combination of the binarized image slices was limited; in response to a determination that the pre-set time interval has not elapsed, continuing to limit processing in the at least one successive image frame; and in response to a determination that the pre-set time interval has elapsed, determining, based on the next image frame after the determination that the pre-set time interval has elapsed, whether to again limit processing in at least one successive image frame after the next image frame.

Example 20 is a system comprising: digital holographic microscopy imaging equipment comprising: a light source configured to emit light toward an object, an opaque material that is opaque to the light, the opaque material having a pinhole arranged to pass the light therethrough toward the object, and an image sensor disposed on an opposite side of the object as the opaque material, the image sensor configured to capture the light after scattering by the object without a lens being disposed between the light source and the image sensor; and computing components configured to: calculate, for each of a predetermined set of depths, a free space impulse response at double precision; receive holographic data of a hologram of the object captured by the image sensor after calculating the free space impulse responses; at each of the depths, calculate, at single precision, a forward Fast Fourier Transform (FFT) of the hologram; at each of the depths, multiply a forward FFT of the free space impulse response at the depth with the forward FFT of the hologram at the depth to form a two-dimensional (2D) matrix; at each of the depths, calculate an inverse FFT of the 2D matrix to form an image slice; and combine the image slices of each of the depths to reconstruct the hologram of the object.

In Example 21, the subject matter of Example 20 further includes that the computing components are further configured to: set a number of first parallel threads equal to a number of the depths; set a number of second parallel threads to an integer ratio of a number of available hardware threads over the number of first parallel threads; and simultaneously compute the inverse FFT of each 2D matrix on a separate first parallel thread to form each image slice.

In Example 22, the subject matter of Example 21 further includes that the computing components are further configured to: subtract a reference image slice from each image slice to form a grayscale image slice; and select a threshold to convert each grayscale image slice from grayscale to a binarized image slice having features limited to black and white.

In Example 23, the subject matter of Example 22 further includes that the computing components are further configured to: combine the binarized image slices by at least one of: using a logical "or" operation to form a 2D representation of the hologram, or placement of the binarized image slices in a 3D array to form a 3D representation of the hologram; fill holes of detected toroids in, and perform segregation of, at least one of the 2D representation of the hologram to form a 2D segmented hologram or the 3D representation of the hologram to form a 3D segmented hologram; and at least one of count or size particles in at least one of the 2D segmented hologram or the 3D segmented hologram.

In Example 24, the subject matter of Example 23 further includes that the computing components are further configured to determine whether to limit processing in at least one successive image frame from a current image frame further includes that the hologram has been captured by: evaluating a difference between the count and size of the particles in the 2D segmented hologram and the count and size of the particles in the 3D segmented hologram; in response to a determination that the difference is less than a predetermined threshold difference, limiting combination of binarized image slices to only formation of a 2D representation of a hologram in the at least one successive image frame determining, in each of the at least one successive frame, whether a pre-set time interval has elapsed from a time when the combination of the binarized image slices was limited, in response to a determination that the pre-set time interval has not elapsed, continuing to limit processing in the at least one successive image frame; and in response to a determination that the pre-set time interval has elapsed, determining, based on the next image frame after the determination that the pre-set time interval has elapsed, whether to again limit processing in at least one successive image frame after the next image frame.

In Example 25, the subject matter of Examples 20-24 further includes that the computing components are disposed in at least one client compute node of an edge computing system.

Example 26 is at least one machine-readable medium including instructions that, when executed by processing circuitry, cause the processing circuitry to perform operations to implement of any of Examples 1-25.

Example 27 is an apparatus comprising means to implement of any of Examples 1-25.

Example 28 is a system to implement of any of Examples 1-25.

Example 29 is a method to implement of any of Examples 1-25.

Example 30 is a computing device, comprising: processing circuitry; and a memory device including instructions embodied thereon, wherein the instructions, which when executed by the processing circuitry, configure the processing circuitry to perform image processing of images captured via digital holographic microscopy, in accordance with the techniques discussed herein.

Example 31 is a method, comprising a plurality of operations executed with a processor and memory of a computing device, to perform image processing optimization techniques upon image data captured via digital holographic microscopy, in accordance with the techniques discussed herein.

Example 32 is a non-transitory device-readable storage medium including instructions, wherein the instructions, when executed by a processing circuitry of a device, cause the processing circuitry to perform image processing optimization techniques upon image data captured via digital holographic microscopy, in accordance with the techniques discussed herein.

Example 33 is an apparatus, comprising respective means for performing image processing optimization techniques upon image data captured via digital holographic microscopy, in accordance with the techniques discussed herein.

Example 34 is a system comprising digital holographic microscopy imaging equipment and respective computing components arranged or configured to perform any of the image processing operations or techniques discussed herein.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations that involve terrestrial network connectivity (where available) to increase network bandwidth/throughput and to support additional edge services. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled. Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

What is claimed is:

1. A computing device, comprising:
   computer readable instructions;
   processing circuitry to execute the computer readable instructions to:
   calculate, for respective depths of a set of depths, respective free space impulse responses at an impulse response precision, the respective depths determined from a reference plane associated with an image sensor;
   calculate, at the respective depths, respective image slices of a hologram from holographic data captured by the image sensor, the holographic data captured after calculation of the free space impulse responses, the image slices calculated at a reconstruction precision that is different from the impulse response precision; and
   reconstruct the hologram from the image slices and the free space impulse responses; and
   a memory device to store the free space impulse responses.

2. The computing device of claim 1, wherein the impulse response precision is double precision and the reconstruction precision is single precision, and the processing circuitry is to calculate the free space impulse responses using twice as many bits as are used in reconstruction of the hologram.

3. The computing device of claim 1, wherein the processing circuitry is to:
   multiply forward Fast Fourier transforms (FFTs) of the respective free space impulse responses corresponding to respective ones of the depths with forward FFTs of the holographic data to form respective two-dimensional (2D) matrices corresponding to the respective ones of the depths; and
   calculate inverse FFTs of the respective 2D matrices to represent the image slices.

4. The computing device of claim 3, wherein the processing circuitry is to, for a respective one of the 2D matrices:
   calculate a module of the respective one of the 2D matrices; and
   scale the module to obtain an intensity of a respective one of the image slices.

5. The computing device of claim 3, wherein the processing circuitry is to:
   set a number of first parallel threads equal to a number of the depths;
   set a number of second parallel threads to an integer ratio of a number of available hardware threads over the number of first parallel threads;
   simultaneously compute the inverse FFTs of the respective 2D matrices on separate ones of the first parallel threads to form the image slices; and
   combine the inverse FFTs to reconstruct the hologram.

6. The computing device of claim 1, wherein the processing circuitry is to subtract a reference image from the respective image slices to correct for at least one of (a) one or more non-uniformities in illumination of an object forming the hologram or (b) one or more imperfections in a device providing the object for illumination.

7. The computing device of claim 6, wherein the processing circuitry is to:
   select a threshold to convert the respective image slices from respective grayscale image slices to respective binarized image slices having features limited to black and white;
   combine the binarized image slices by at least one of:
     a logical "or" operation to form a two-dimensional (2D) representation of the object, or
     placement of the binarized image slices in a three-dimensional (3D) array that represents a scanned volume of the object to form a 3D representation of the object;
   fill holes of detected toroids in, and perform segregation of, at least one of the 2D representation of the object to form a 2D segmented object or the 3D representation of the object to form a 3D segmented object; and
   at least one of count or size particles in at least one of the 2D segmented object or the 3D segmented object.

8. The computing device of claim 7, wherein the processing circuitry is to:
   determine whether to limit processing in at least one successive image frame from a current image frame in which the hologram has been captured; and
   determine whether to limit processing in the at least one successive image frame by:
     evaluating a difference between the count and size of the particles in the 2D segmented object and the count and size of the particles in the 3D segmented object; and
     in response to a determination that the difference is less than a threshold difference, limiting combination of second binarized image slices associated with the at least one successive image frame to formation of a 2D representation of an object in the at least one successive image frame without formation of a 3D representation of the object in the at least one successive image frame.

9. The computing device of claim 8, wherein to determine whether to limit processing in the at least one successive image frame, the processing circuitry is to:
determine whether a threshold time interval has elapsed from a time when the combination of the second binarized image slices was limited;
in response to a determination that the threshold time interval has not elapsed, continue to limit processing in the at least one successive image frame; and
in response to a determination that the threshold time interval has elapsed, determine, based on a next image frame after the determination that the threshold time interval has elapsed, whether to again limit processing in at least one successive image frame after the next image frame.

10. The computing device of claim 1, wherein the processing circuitry is to calculate the free space impulse responses prior to reconstruction of the hologram.

11. The computing device of claim 1, wherein the processing circuitry is to calculate the free space impulse responses and reconstruct the hologram without using graphics processing unit (GPU) acceleration.

12. The computing device of claim 1, wherein the processing circuitry is to calculate the free space impulse responses and reconstruct the hologram at a rate of at least 20 frames per second.

13. The computing device of claim 1, wherein the processing circuitry is to at least one of perform particle detection, particle counting or particle sizing from a reconstruction of the hologram.

14. A non-transitory device-readable storage medium comprising instructions to cause processing circuitry to at least:
calculate, for respective depths of a set of depths, respective free space impulse responses at double precision, the depths determined from a reference plane;
capture, at an image sensor, a hologram after calculation of the free space impulse responses, the reference plane associated with the image sensor;
calculate, at single precision, respective forward Fast Fourier Transforms (FFTs) of the hologram at respective ones of the depths;
multiply, at respective ones of the depths, respective forward FFTs of the free space impulse response at the respective ones of the depths with the respective forward FFTs of the hologram at the respective ones of the depths to form respective two-dimensional (2D) matrices at the respective ones of the depths;
calculate, for the respective ones of the depths, respective inverse FFTs of the 2D matrices at the respective ones of the depths to form respective image slices at the respective ones of the depths; and
combine the respective image slices from the respective ones of the depths to reconstruct the hologram in at least one of a combined 2D array or a combined three-dimensional (3D) array.

15. The non-transitory device-readable storage medium of claim 14, wherein the instructions are to cause the processing circuitry to:
set a number of first parallel threads equal to a number of the depths;
set a number of second parallel threads to an integer ratio of a number of available hardware threads over the number of first parallel threads; and
simultaneously compute the inverse FFTs of the respective 2D matrices on separate first parallel threads to form the respective image slices.

16. The non-transitory device-readable storage medium of claim 15, wherein the instructions are to cause the processing circuitry to:
subtract respective reference image slices from the respective image slices to form respective grayscale image slices; and
select a threshold to convert the respective grayscale image slices from grayscale to respective binarized image slices having features limited to black and white.

17. The non-transitory device-readable storage medium of claim 16, wherein the instructions are to cause the processing circuitry to:
combine the binarized image slices by at least one of:
a logical "or" operation to form a 2D representation of the hologram, or
placement of the binarized image slices in a 3D array to form a 3D representation of the hologram;
fill holes of detected toroids in, and perform segregation of, at least one of the 2D representation of the hologram to form a 2D segmented hologram or the 3D representation of the hologram to form a 3D segmented hologram; and
at least one of count or size particles in at least one of the 2D segmented hologram or the 3D segmented hologram.

18. The non-transitory device-readable storage medium of claim 17, wherein the instructions are to cause the processing circuitry to determine whether to limit processing in at least one successive image frame from a current image frame in which the hologram has been captured by:
evaluating a difference between the count and size of the particles in the 2D segmented hologram and the count and size of the particles in the 3D segmented hologram;
in response to a determination that the difference is less than a threshold difference, limiting combination of second binarized image slices associated with the at least one successive image frame to formation of a second 2D representation of a second hologram associated with the at least one successive image frame;
determining whether a threshold time interval has elapsed from a time when the combination of the second binarized image slices was limited;
in response to a determination that the threshold time interval has not elapsed, continuing to limit processing in the at least one successive image frame; and
in response to a determination that the threshold time interval has elapsed, determining, based on a next image frame after the determination that the threshold time interval has elapsed, whether to again limit processing in at least one successive image frame after the next image frame.

19. A system comprising:
digital holographic microscopy imaging equipment comprising including:
a light source to emit light toward an object,
an opaque material that is opaque to the light, the opaque material having a pinhole to pass the light therethrough toward the object, and
an image sensor disposed on an opposite side of the object from the opaque material, the image sensor to capture the light after scattering by the object without a lens between the light source and the image sensor;

instructions; and circuitry to utilize the instructions to:
 calculate, for respective depths of a set of depths, respective free space impulse responses at double precision;
 obtain holographic data of a hologram of the object captured by the image sensor after calculation of the free space impulse responses;
 at respective ones of the depths, calculate, at single precision, respective forward Fast Fourier Transforms (FFTs) of the hologram;
 at respective ones of the depths, multiply respective forward FFTs of the free space impulse response at the respective ones of the depths with the respective forward FFTs of the hologram at the respective ones of the depths to form respective two-dimensional (2D) matrices at the respective ones of the depths;
 at the respective ones of the depths, calculate respective inverse FFTs of the 2D matrices at the respective ones of the depths to form respective image slices at the respective ones of the depths; and
 combine the respective image slices of the respective ones of the depths to reconstruct the hologram of the object.

20. The system of claim 19, wherein the circuitry is to:
set a number of first parallel threads equal to a number of the depths;
set a number of second parallel threads to an integer ratio of a number of available hardware threads over the number of first parallel threads; and
simultaneously compute the inverse FFTs of each 2D matrix the respective 2D matrices on separate first parallel threads to form the respective image slices.

21. The system of claim 20, wherein the circuitry is to:
subtract respective reference image slices from the respective image slices to form respective grayscale image slices; and
select a threshold to convert the respective grayscale image slices from grayscale to respective binarized image slices having features limited to black and white.

22. The system of claim 21, wherein the circuitry is to:
combine the binarized image slices by at least one of:
 a logical "or" operation to form a 2D representation of the hologram, or
 placement of the binarized image slices in a 3D array to form a 3D representation of the hologram;
fill holes of detected toroids in, and perform segregation of, at least one of the 2D representation of the hologram to form a 2D segmented hologram or the 3D representation of the hologram to form a 3D segmented hologram; and
at least one of count or size particles in at least one of the 2D segmented hologram or the 3D segmented hologram.

23. The system of claim 22, wherein the circuitry is to determine whether to limit processing in at least one successive image frame from a current image frame in which the hologram has been captured by:
evaluating a difference between the count and size of the particles in the 2D segmented hologram and the count and size of the particles in the 3D segmented hologram;
in response to a determination that the difference is less than a threshold difference, limiting combination of second binarized image slices to formation of a second 2D representation of a second hologram associated with the at least one successive image frame;
determining whether a time interval has elapsed from a time when the combination of the second binarized image slices was limited;
in response to a determination that the time interval has not elapsed, continuing to limit processing in the at least one successive image frame; and
in response to a determination that the time interval has elapsed, determining, based on a next image frame after the determination that the time interval has elapsed, whether to again limit processing in at least one successive image frame after the next image frame.

24. The system of claim 19, wherein the circuitry is in at least one client compute node of an edge computing system.

* * * * *